US012656301B2

(12) United States Patent
Hirayama

(10) Patent No.: US 12,656,301 B2
(45) Date of Patent: Jun. 16, 2026

(54) GAS CONCENTRATION DETECTING APPARATUS

(71) Applicant: DENSO CORPORATION, Kariya-city (JP)

(72) Inventor: Takashi Hirayama, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 256 days.

(21) Appl. No.: 18/468,058

(22) Filed: Sep. 15, 2023

(65) Prior Publication Data

US 2024/0003842 A1 Jan. 4, 2024

Related U.S. Application Data

(63) Continuation of application No. PCT/JP2022/008624, filed on Mar. 1, 2022.

(30) Foreign Application Priority Data

Mar. 18, 2021 (JP) ................................. 2021-044216

(51) Int. Cl.
*G01N 27/409* (2006.01)
*G01N 27/419* (2006.01)

(52) U.S. Cl.
CPC ......... *G01N 27/409* (2013.01); *G01N 27/419* (2013.01)

(58) Field of Classification Search
CPC ............... G01N 27/409; G01N 27/419; G01N 27/4175; G01N 27/4067
See application file for complete search history.

(56) References Cited

U.S. PATENT DOCUMENTS

| | | | |
|---|---|---|---|
| 6,258,232 B1* | 7/2001 | Hasegawa | F02D 41/1494 |
| | | | 73/23.32 |
| 6,336,354 B1* | 1/2002 | Suzuki | G01N 27/4067 |
| | | | 338/34 |
| 2004/0045824 A1 | 3/2004 | Hada et al. | |

(Continued)

FOREIGN PATENT DOCUMENTS

| | | |
|---|---|---|
| CN | 111181549 | 5/2020 |
| JP | 2000180409 A | 6/2000 |

(Continued)

OTHER PUBLICATIONS

Kurokawa et al., JP2004125482A, English translation, 2004 (Year: 2004).*

*Primary Examiner* — Shizhi Qian
(74) *Attorney, Agent, or Firm* — Nixon & Vanderhye P.C.

(57) ABSTRACT

A sensor control apparatus of a gas concentration detecting apparatus is provided with a sensor detecting unit, a temperature detecting unit, a heater control unit, a change rate calculation unit and a calibration outputting unit. The change rate calculation unit calculates a change rate of a heater current flowing through a heater when a heater control unit maintains the temperature of a sensor cell detected by a temperature detecting unit to be at a target temperature. The calibration outputting unit utilizes a change rate of a heater current to calibrate the sensor output as a sensor current detected by the sensor detecting unit and calculates a sensor calibration output of a gas sensor.

9 Claims, 16 Drawing Sheets

(56)     References Cited

U.S. PATENT DOCUMENTS

| | | | | |
|---|---|---|---|---|
| 2007/0215470 A1* | 9/2007 | Kawase | ............. | G01N 27/4065 |
| | | | | 204/424 |
| 2016/0139073 A1* | 5/2016 | Mcquillen | .......... | G01N 27/4067 |
| | | | | 205/784.5 |
| 2017/0234831 A1 | 8/2017 | Nakano | | |
| 2018/0266988 A1* | 9/2018 | Oh | ......................... | G01N 27/14 |
| 2018/0299404 A1 | 10/2018 | Nunome et al. | | |
| 2021/0270768 A1* | 9/2021 | Okamoto | .......... | G01N 27/4062 |

FOREIGN PATENT DOCUMENTS

| | | | | | |
|---|---|---|---|---|---|
| JP | 2004093386 A | | 3/2004 | | |
| JP | 2004125482 A | * | 4/2004 | | |
| JP | 2006113081 A | | 4/2006 | | |
| JP | 3845998 B2 | * | 11/2006 | ......... | G01N 27/4067 |
| JP | 2008128956 A | | 6/2008 | | |
| JP | 2017146205 A | | 8/2017 | | |
| JP | 2018040715 A | | 3/2018 | | |
| JP | 2018072005 A | | 5/2018 | | |
| JP | 2018128463 A | | 8/2018 | | |

* cited by examiner

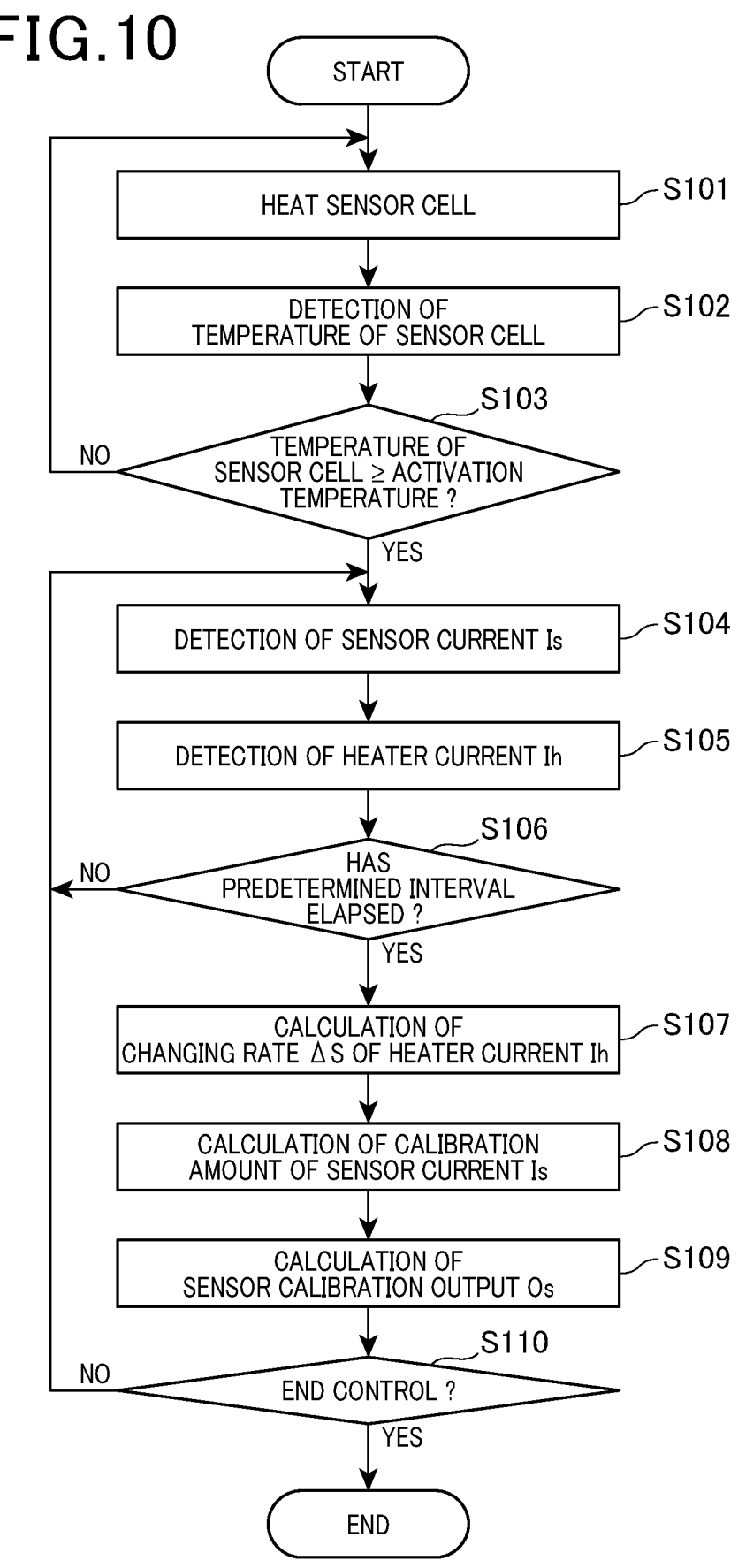

START

HEAT SENSOR CELL — S101

DETECTION OF TEMPERATURE OF SENSOR CELL — S102

S103
TEMPERATURE OF SENSOR CELL ≥ ACTIVATION TEMPERATURE ?
NO
YES

DETECTION OF SENSOR CURRENT Is — S104

DETECTION OF HEATER CURRENT Ih — S105

S106
HAS PREDETERMINED INTERVAL ELAPSED ?
NO
YES

CALCULATION OF CHANGING RATE △S OF HEATER CURRENT Ih — S107

CALCULATION OF CALIBRATION AMOUNT OF SENSOR CURRENT Is — S108

CALCULATION OF SENSOR CALIBRATION OUTPUT Os — S109

S110
END CONTROL ?
NO
YES

END

GAS CONCENTRATION DETECTING APPARATUS

CROSS-REFERENCE OF RELATED APPLICATIONS

This application is the U.S. bypass application of International Application No. PCT/JP2022/008624 filed on Mar. 1, 2022, which designated the U.S. and claims priority to Japanese Patent Application No. 2021-044216 filed on Mar. 18, 2021, the contents of which is incorporated herein by reference.

BACKGROUND

Technical Field

The present disclosure relates to a gas concentration detecting apparatus.

Description of the Related Art

The gas concentration detecting apparatus is configured using a gas sensor disposed at an exhaust pipe of a vehicle and a sensor control apparatus that controls an operation of the gas sensor. The gas sensor includes a sensor cell of which the pair of electrodes are disposed in the solid electrolyte and a heater generating heat when being energized to heat the sensor cell. Usually, the heater is energized with PWM (pulse width modulation) control to accomplish high responsivity to a load variation.

SUMMARY

A first aspect of the present disclosure is a gas concentration detecting apparatus including: a gas sensor having one or more sensor cells each provided with a pair of electrodes on a solid electrolyte, and a heater generating heat when being energized to heat the sensor cell; and a sensor control apparatus that controls an operation of the sensor cell and the heater.

BRIEF DESCRIPTION OF THE DRAWINGS

The above-described objects and other objects, features and advantages of the present disclosure will be clarified further by the following detailed description with reference to the accompanying drawings. The drawings of the present disclosure are as follows.

FIG. 1 is a cross-sectional view showing a gas sensor of a gas concentration detecting apparatus according to a first embodiment.

FIG. 10 is a flowchart showing a control method executed by the gas concentration detecting apparatus according to the first embodiment.

DETAILED DESCRIPTION OF THE PREFERRED EMBODIMENTS

Figure 2:
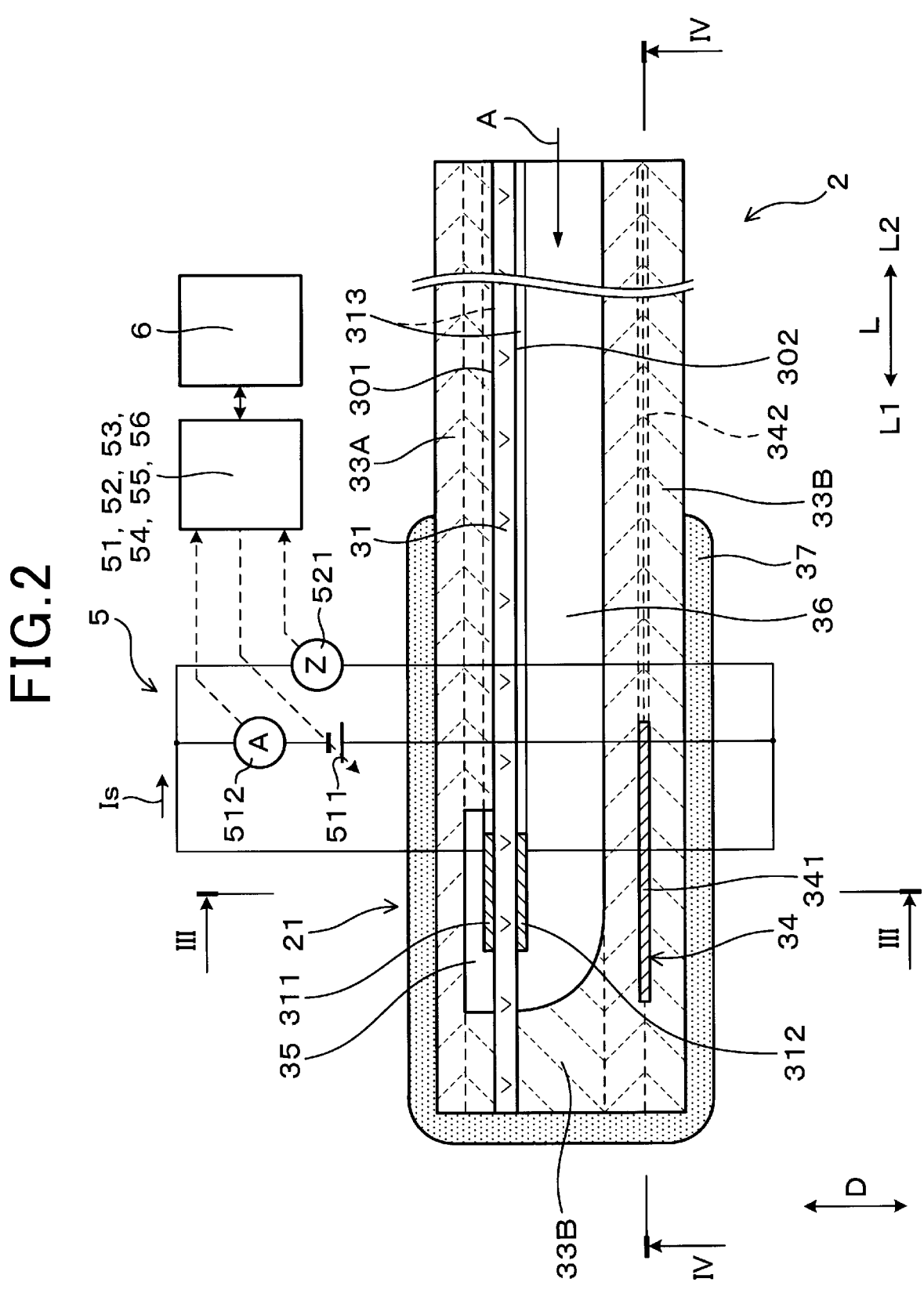
FIG. 2 is a cross-sectional view showing a sensor element of a gas sensor according to the first embodiment.

The gas concentration detecting apparatus is configured using a gas sensor disposed at an exhaust pipe of a vehicle and a sensor control apparatus that controls an operation of the gas sensor. The gas sensor includes a sensor cell of which the pair of electrodes are disposed in the solid electrolyte and a heater generating heat when being energized to heat the sensor cell. Usually, the heater is energized with PWM (pulse width modulation) control to accomplish high responsivity to a load variation.

When performing the PWM control of the heater, pulse-wave voltage is applied to the heater such that a duty ratio indicating an ON-OFF ratio in each period of the pulse-shaped voltage is appropriately changed, thereby controlling the temperature of the sensor cell to be a target temperature. As a gas concentration detecting apparatus that performs PWM control for the heater, for example, JP-A-2004-093386 discloses one example.

According to the gas concentration detecting apparatus, a noise component superposed on the output signal of the sensor cell is eliminated from the output signal by an averaging process. More specifically, when the heater is turned ON, positive noise occurs on the output signal and when the heater is turned OFF, negative noise occurs on the output signal. According to the gas concentration detecting apparatus of the above patent literature, an averaging process is applied such that the positive noise and the negative noise appears in the opposite side so as to cancel the noise.

However, the inventor has found by research that other noise components are present in the noise components superposed on the output signal of the sensor cell other than a short-period of noise component due to ON-OFF switching of the energization of the heater (i.e. switching noise component). Specifically, in the case where the temperature of the sensor cell is maintained at the target temperature under the PWM control of the heater, it is identified that noise components having longer period (temperature control noise component) than that of the switching noise component is superposed on the sensor cell. The temperature control noise component is understood as a periodical shift in a temperature change or an effective value of the temperature change, and it is discovered that the temperature control noise component has a change speed different from that of the switching noise component.

Therefore, further improvement is required when eliminating the noise component contained in the output signal of the sensor cell to enhance the detection accuracy of the gas concentration detecting apparatus.

With reference to the drawings, preferred embodiments of the above-described gas concentration detecting apparatus will be described.

First Embodiment

Figure 1:
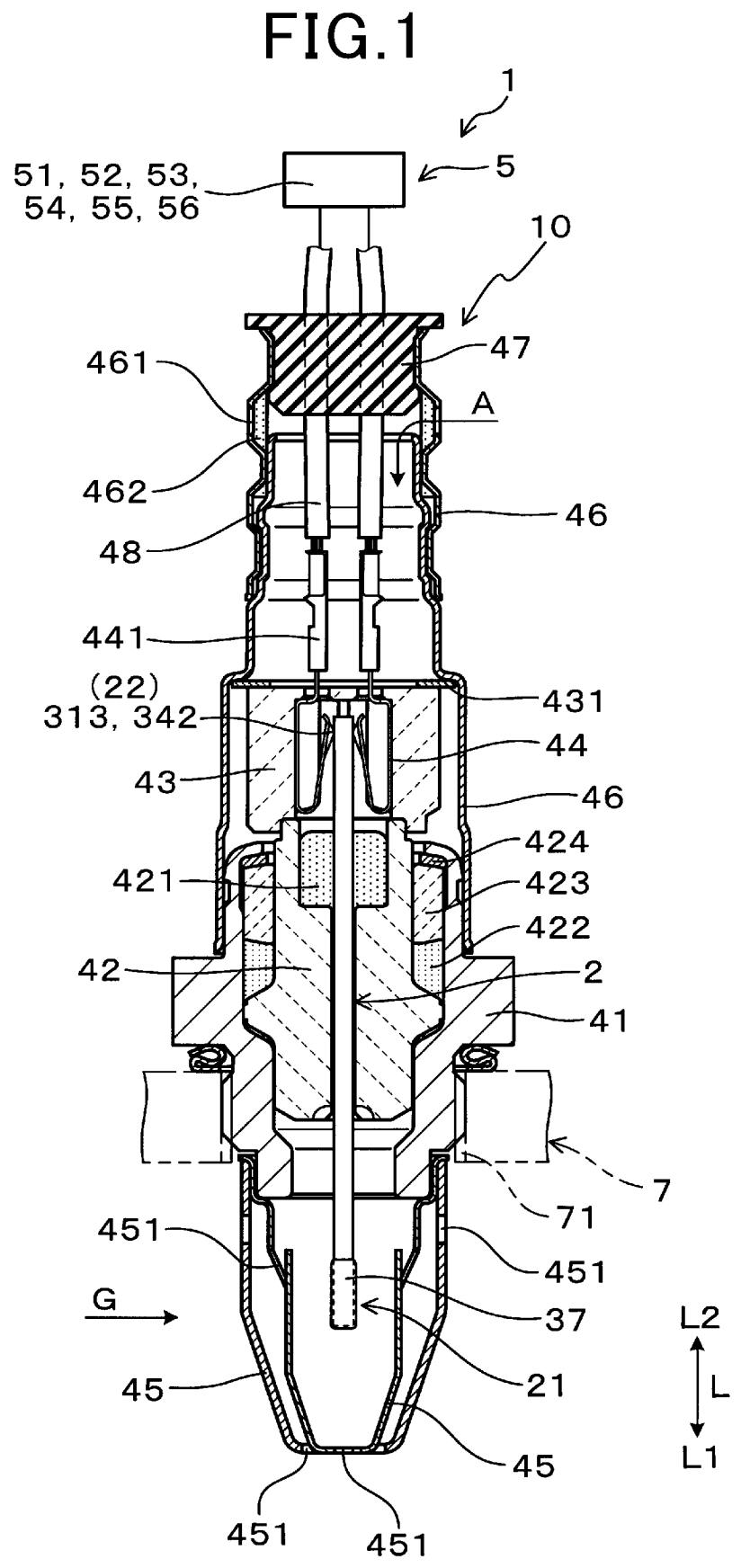

As shown in FIGS. 1 to 4, a gas concentration detecting apparatus 1 according to the present embodiment is provided with a gas sensor 10 and a sensor control apparatus 5. The gas sensor 10 includes one or more sensor cells 21 in which a pair of electrodes 311 and 312 are provided in the solid electrolyte 31, and a heater 34 that produces heat when being energized, thereby heating the sensor cells 21. The sensor control apparatus 5 is configured to control the operation of the sensor cells 21 and the heater 34.

Figure 5:
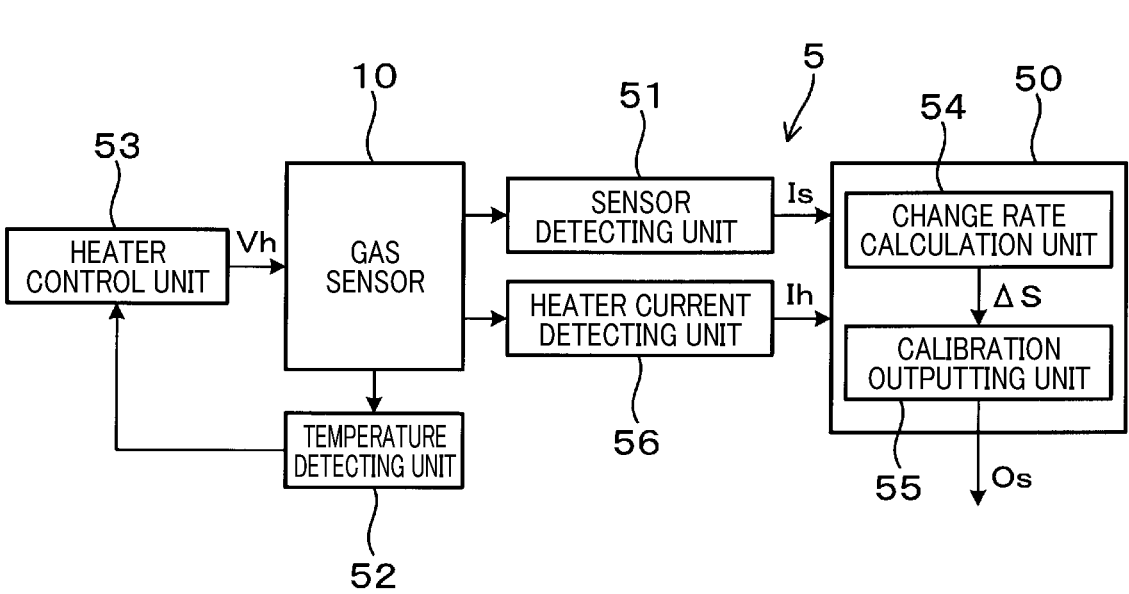
FIG. 5 is an explanatory diagram schematically showing an electrical configuration of the sensor control apparatus according to the first embodiment.

As shown in FIG. 5, the sensor control apparatus 5 includes a sensor detecting unit 51, a temperature detecting unit 52, a heater control unit 53, a change rate calculation unit 54 and a calibration outputting unit 55. The sensor detecting unit 51 detects sensor current Is generated in the sensor cell 21. The temperature detecting unit 52 detects a temperature of the sensor cell 21. The heater control unit 53 adjusts an application voltage Vth to the heater 34.

The change rate calculation unit 54 calculates a change rate ΔS of the heater current Ih flowing through the heater 34 when the heater control unit 53 maintains the temperature of the sensor cell 21 detected by the temperature detecting unit 52 to be at the target temperature. The calibration outputting unit 55 utilizes change rate ΔS of the heater current Ih calculated by the change rate calculation unit 54 to calibrate the sensor output which is the sensor current Is detected by the sensor detecting unit 51, thereby calculating a sensor calibration output Os of the gas sensor 10.

Hereinafter, a gas concentration detecting apparatus 1 according to the present embodiment will be described in detail.

(Gas Sensor 10)

As shown in FIG. 1, the gas sensor 10 is disposed at a mount hole 71 of an exhaust pipe 7 of an internal combustion engine (engine) of a vehicle. The gas sensor 10 is used for detecting an oxygen concentration, a specific gas concentration in a detection object gas which is an exhaust gas G flowing through the exhaust pipe 7. The gas sensor 10 can be used as an air-fuel ratio sensor (i.e. A/F sensor) that obtains the air-fuel ratio in the internal combustion engine based on the oxygen concentration and unburnt gas concentration in the exhaust gas 10. The air-fuel ratio sensor is configured to detect the air-fuel ratio continuously and quantitively from a fuel rich state where a ratio of fuel to air is larger than the theoretical air-fuel ratio to a fuel lean state where a ratio of fuel to air is smaller than the theoretical air-fuel ratio.

A catalyst is provided in the exhaust pipe 7 to purify toxic substances in the exhaust gas G and the gas sensor 10 may be disposed at either in an upper stream side or down stream side of the catalyst in the flow direction of the exhaust gas G in the exhaust pipe 7. Further, the gas sensor 10 may be disposed in an inlet side pipe of a supercharger that enhances a density of an intake air of the internal combustion engine using the exhaust gas G. Moreover, a pipe to which the gas sensor 10 is disposed may be a pipe of an exhaust gas recirculation mechanism allowing a part of the exhaust gas G exhausted to the exhaust pipe 7 from the internal combustion engine to recirculate into the inlet pipe of the internal combustion engine.

(Sensor Cell 21)

Figure 3:
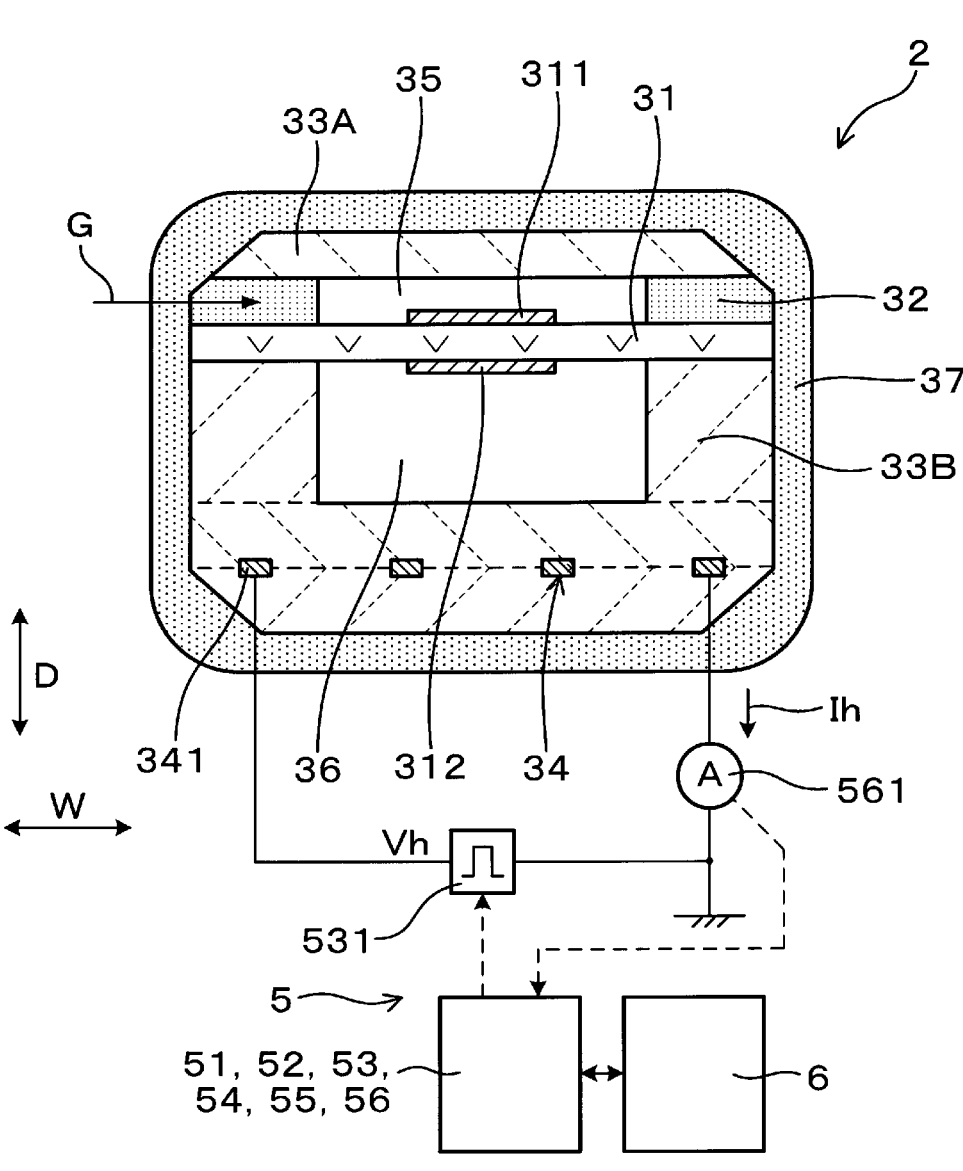
FIG. 3 is a cross-sectional view according to the first embodiment sectioned at line III-III of FIG. 2.
Figure 4:
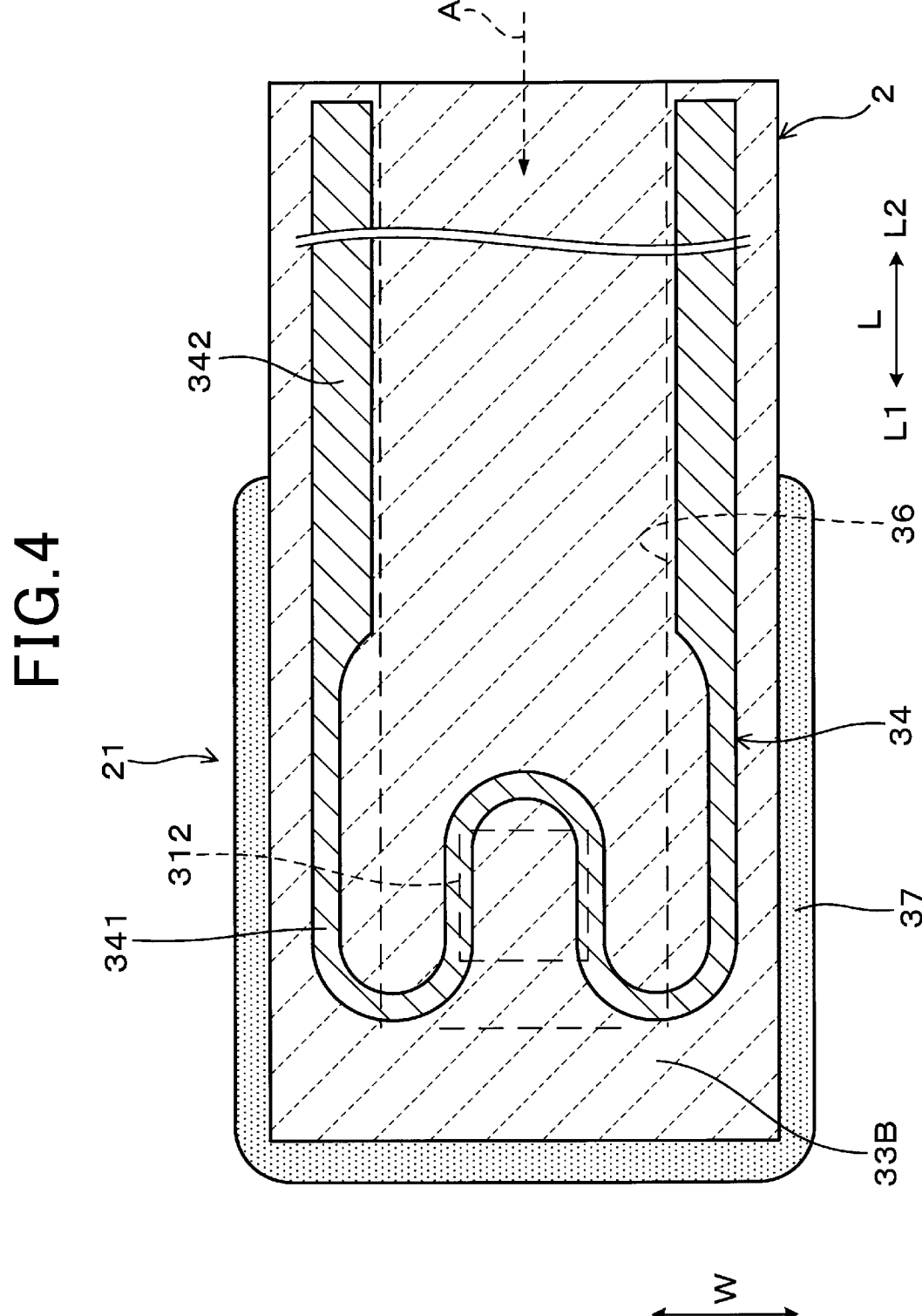
FIG. 4 is a cross-sectional view according to the first embodiment sectioned at line IV-IV of FIG. 2.

As shown in FIGS. 2 to 4, the sensor cell 21 and the heater 34 of the gas sensor 10 is formed of the sensor element 2. The sensor cell 21 is configured of a solid electrolyte 31, an exhaust electrode 311 and an atmosphere electrode 312 provided in the solid electrolyte 31. For the solid electrolyte 31, an insulator 33A and 33B are laminated, and the heater 34 is configured of a heating element embedded to the insulator 33A and 33B.

For the sensor cell 21 according to the present embodiment, one sensor cell 21 is formed in the gas sensor 10 to configure the air-fuel ratio sensor. Other than this, a plurality of sensor cells 21 may be formed in the gas sensor 10 so as to configure a NOx (nitrogen oxide) sensor. The sensor cell 21 in this case may be configured as a pump cell that lowers the oxygen concentration of the exhaust gas G, a monitor cell that detects residual oxygen concentration of the exhaust gas G and a detection cell that detects the NOx concentration of the exhaust gas G.

The gas sensor 10 may be provided with a plurality of sensor cells 21 for detecting the air-fuel ratio, the NOx concentration and the like. For the sensor cell 21 that calibrates the sensor output with the change rate calculation unit 54 and the calibration outputting unit 55, a plurality of sensor cells 21 may be provided.

(Sensor Element 2)

As shown in FIGS. 2 to 4, the sensor element 2 of the present disclosure is formed in a long rectangular shape and provided with a solid electrolyte 31, an exhaust electrode 311, an atmosphere electrode 312, a first insulator 33A, a second insulator 33B, a gas chamber 35, an atmospheric air duct 36 and a heater 34. The sensor element 2 is configured as a laminate type element in which respective insulators 33A and 33B, and the heater 34 are laminated.

According to the present embodiment, the longitudinal direction L of the sensor element 2 refers to a direction with which the sensor element 2 rectangularly extends. Further, a direction orthogonal to the longitudinal direction L, along which the solid electrolyte 31 and respective insulators 33A and 33B are laminated, is referred to a laminate direction D. Further, a direction orthogonal to both the longitudinal direction L and the laminate direction is referred to as a width direction W. Further, a tip end side L1 with respect to the longitudinal direction L of the sensor element 2 is defined as a portion exposed to the exhaust gas G, and the opposite side of the tip end side L1 is defined as a base end side L2. Also, in the gas sensor 10, a direction the same as the longitudinal direction L of the sensor element 2 is defined as the longitudinal direction L.

(Solid Electrolyte 31, Exhaust Electrode 311 and Atmosphere Electrode 312)

As shown in FIGS. 2 to 4, the solid electrolyte 31 has a conductivity for oxygen ion ($O^{2-}$) at a predetermined activation temperature. The exhaust electrode 311 exposed to the exhaust gas G is provided on a first surface 301 of the solid electrolyte 31, and the atmosphere electrode 312 exposed to atmospheric air A is provided on a second surface 302 of the solid electrolyte 31. The exhaust gas electrode 311 and the atmosphere electrode 312 are arranged at a portion mutually overlapping in the laminate direction D via the solid electrolyte 31 in a tip end side L1 exposed to the exhaust gas G in the longitudinal direction L of the sensor element. In a tip end side L1 in the longitudinal direction L of the sensor element 2, the sensor cell 21 is formed by the exhaust electrode 311 and the atmosphere electrode 312, and a portion of the solid electrolyte 31 between these electrodes 311 and 312. The first insulator 33A is formed on the first surface 301 of the solid electrolyte 31, and the second insulator 33B is formed on the second surface 302.

The solid electrolyte 31 is composed of zirconia-based oxide containing zirconia as a main component (containing 50% mass % or more), such as a stabilized zirconia or a partial stabilized zirconia where a part of zirconia is substituted with a metallic element of the rare earth group or an alkaline-earth metal. A part of zirconia that constitutes the solid electrolyte 31 is substituted by yttria, scandia or calcia.

The exhaust electrode 311 and the atmosphere electrode 312 contain platinum as a noble metal indicating catalytic activity to oxygen and a zirconia-based oxide as a co-material of the solid electrolyte 31. As shown in FIG. 1, an electrode lead part 313 is connected to the exhaust electrode 11 and the atmosphere electrode 312 for electrically connecting them to outside part of the gas sensor 10. The electrode lead part 313 is drawn out to a portion in the base end side L2 in the longitudinal direction L of the sensor element 2. A terminal connection part 22 is formed in an end portion in the base end side L2 in the longitudinal direction L of the electrode lead part 313.

(Gas Chamber 35)

As shown in FIGS. 2 and 3, the gas chamber 35 surrounded by the first insulator 33A and the solid electrolyte 31 is adjacently formed on the first surface 301 of the solid electrolyte 31. The gas chamber 35 is formed at a portion accommodating the exhaust electrode 311 in a tip end side L1 in the longitudinal direction L of the first insulator 33A. The gas chamber 35 is formed as a space part closed by the first insulator 33A and a diffusion resistance part 32 and the solid electrolyte 31. The exhaust gas G flowing through the exhaust pipe 7 is introduced to the gas chamber 35 passing through the diffusion resistance part 32.

(Diffusion Resistance Part 32)

As shown in FIG. 3, the diffusion resistance part (gas introduction part) 32 according to the present embodiment is provided at both sides of the gas chamber 35 in the width direction W. The diffusion resistance part 32 is formed by providing a porous body of metal oxide such as aluminum oxide in an introduction hole formed at the first insulator 33A. The diffusion speed (flow rate) of the exhaust gas G introduced in the gas chamber 35 is determined by limiting the speed of the exhaust gas G passing through pores in the porous body in the diffusion resistance part 32. Note that the diffusion resistance part 32 may be provided at a portion in the tip end side L1 of the gas chamber 35 in the longitudinal direction L.

(Atmospheric Air Duct 36)

As shown in FIGS. 2 to 4, the atmospheric air duct 36 surrounded by the second insulator 33B and the solid electrolyte 31 is adjacently formed on the second surface 302 of the solid electrolyte 31. The atmospheric air duct 36 is formed from a portion on the second insulator 33B accommodating the atmosphere electrode 312 in the longitudinal direction L to a base end portion of the sensor element 2 in the longitudinal direction L.

(Respective Insulators 33A and 33B)

As shown in FIGS. 2 to 4, the first insulator 33A forms the gas chamber 35, and the second insulator 33B forms the atmospheric air duct 36 includes the heater 34 embedded thereto. The first insulator 33A and the second insulator 33B are formed of metal oxide such as alumina (aluminum oxide). The respective insulators 33A and 33B are formed of a dense body through which the exhaust gas G or the atmospheric air cannot transmit.

(Heater 34)

As shown in FIGS. 3 and 4, the heater 34 is configured as a heating element and embedded to the second insulator 33B that forms the atmospheric air duct 36. The heater 34 includes a heating part 341 that generates heat when being energized and a heating lead part 342 connected to a portion in a base end side L2 of the heating part 341 in the longitudinal direction L. The heating part 341 is disposed in a portion where a part of the heating part 341 is overlapping with the exhaust electrode 311 and the atmosphere electrode 312 in a laminate direction D of the solid electrolyte 31 and respective insulators 33A and 33B. The heater 34 is configured of a metal material having conductivity. The terminal connection part 22 is formed at an end portion in the base end side L2 of the heating lead 342 in the longitudinal direction L.

(Surface Protection Layer 37)

As shown in FIG. 1, a surface protection layer 37 that covers the sensor cell 21 is formed at a portion in the tip end side L1 of the sensor element 2 in the longitudinal direction L. The surface protection layer 37 is configured of a plurality of mutually coupled ceramic particles as a ceramic material having pores that allow the exhaust gas G to pass through.

(Configuration of Other Sensor Element 2)

Although illustration is omitted, the sensor element 2 is not limited to the one having a single solid electrolyte 31, but the sensor element 2 may be one having two or more solid electrolyte 31. The electrodes 311 and 312 provided in the electrolyte 31 are not limited to a pair of the exhaust electrode 311 and the atmosphere electrode 312 but may be a plurality of pairs of electrodes. In the case where a plurality of pairs of electrodes are provided on one or more electrolyte 31, the heating part 341 of the heater 34 can be provided at a portion facing the plurality of pairs of electrodes in the lamination direction D.

(Configurations Other than Gas Sensor 10)

As shown in FIG. 1, in order to dispose the sensor element 2 on the exhaust pipe 7 to be connected to the sensor control apparatus 5, the gas sensor 10 is provided with a housing 31, an element support 42, a terminal support 43, a contact member 431, a contact terminal 44, a tip end side cover 45, a base end side cover 46, a bush 47, a lead wire 48 and the like.

The housing 41 is used for fastening the gas sensor 10 to the mount hole 71 of the exhaust pipe 7. The housing 41 supports the sensor element 2 via the element support 42. The sensor element 2 is supported by the element support 42 via the glass powder 421. The element support 42 is supported by the housing 41 via a caulking material 422, 423 and 424. The terminal support 43 that supports the contact terminal 44 is coupled to a portion in a base end side L2 of the element support 42 in the longitudinal direction L. The terminal support 43 is supported by the base end side cover 46 with the contact member 431.

The contact terminal 44 contacts with the base end portion of the electrode lead part 313 as the terminal connection part 22 and contacts with the base end portion of the heating lead part 342 as the terminal connection part 22 in the sensor element 2, so as to electrically connect the electrode lead part 313 and the heating lead part 342 to the lead wire 48. The contact terminal 44 is connected to the lead wire 48 via a connection fitting 441 in a state of being disposed in the terminal support 43.

As shown in FIG. 1, the tip end side cover 45 is provided in a tip end side L1 of the housing 41 in the longitudinal direction L, covering the sensor cell 21 of the sensor element 2. For the tip end side cover 45, a gas communicating hole 451 is formed to allow the exhaust gas G touching the sensor element 2 to pass therethrough. The sensor cell 21 of the sensor element 2 and the tip end side cover 45 are provided in the exhaust pipe 7 of the internal combustion engine. A part of the exhaust gas G flowing in the exhaust pipe 7 flows inside the tip end side cover 45 from the gas communicating hole 451 of the tip end side cover 45. Then, the exhaust gas G inside the tip end side cover 45 passes the surface protection layer 37 of the sensor element 2 and the diffusion resistance part 32 and is guided to the exhaust electrode 311.

The base end side cover 46 is provided in the base end side L2 of the housing 41 in the longitudinal direction L, covering a wiring part positioned in the base end side L2 of the gas sensor 10 in the longitudinal direction L so as to prevent the wiring part from being exposed to atmospheric moisture in the atmospheric air A. The wiring part is configured of, as a portion electrically connected to the sensor element 2, the contact terminal 44, a connecting part (i.e. connection fitting 441) between the contact terminal 33 and the lead wire 48, and the like.

The bush 47 is supported at an inner periphery side of a portion in the base end side L2 of the base end side cover 46 in the longitudinal direction L. An atmospheric air introduction hole 461 is formed at the base end side cover 46 for introducing the atmospheric air A from outside the gas sensor 10. The atmospheric air introduction hole 461 is covered by a water repellent filter 462. The base end position of the atmospheric air duct 36 in the sensor element 2 is opened to a space inside the base end side cover 46, and the atmospheric air A is guided to the atmosphere electrode 312 in the atmospheric air duct 36.

(Sensor Control Apparatus 5)

As shown in FIG. 1, the lead wire 48 in the gas sensor 10 is electrically connected to the sensor control apparatus 5 that controls a gas detection of the gas sensor 10. The sensor control apparatus 5 performs an electrical control of the gas sensor 10 together with an engine control apparatus 5 that controls a combustion operation of the engine. The sensor control apparatus 5 is configured of various control circuits, a computer and the like. The sensor control apparatus 5 may be configured within the engine control apparatus 6.

FIG. 5 schematically shows an electrical configuration of the sensor control apparatus 5. The sensor detecting unit 51, the temperature detecting unit 52, the heater control unit 53 and a heater current detecting unit 56 are mainly configured of a control circuit. The change rate calculation unit 54 and the calibration outputting unit 55 are mainly configured of a computer 50. In the sensor control apparatus 5, the temperature of the sensor cell 21 detected by the temperature detecting unit 52 is feed-backed and the heater control unit 53 performs a feedback control of the temperature of the sensor cell 21. Also, in the sensor control apparatus 5, a heater current Ih detected by the heater current detecting unit 56 is utilized to calculate the change rate ΔS of the heater current Ih by the change rate calculation unit 54. Then, the calibration outputting unit 55 calibrates the sensor current Is detected by the sensor detecting unit 51 based on the change rate ΔS and calculates the sensor calibration output Os.

(Sensor Detecting Unit 51)

As shown in FIG. 2, the sensor detecting unit 51 is provided with a voltage application circuit 511 that applies DC voltage between the exhaust electrode 311 and the atmosphere electrode 312 and a current detecting circuit 512 that measures current flowing between the exhaust electrode 311 and the atmosphere electrode 312. The voltage application circuit 511 applies DC voltage between the electrodes 311 and 312, where an amount of the DC voltage is determined to be a value causing limit current characteristics on the sensor cell 21 due to the diffusion resistance of the diffusion resistance part 32 when the exhaust gas G flows into the gas chamber 35. The voltage application circuit 511 applies the DC voltage between the electrodes 311 and 312 such that the positive side electrode is the atmosphere electrode 312 to discharge oxygen in the gas chamber 35.

In the sensor detecting unit 51, when the exhaust gas G after being combusted in the internal combustion engine at a fuel lean state reaches the exhaust electrode 311, the sensor current Is at the positive side is mainly detected, and when the exhaust gas G after being combusted in the internal combustion engine at a fuel rich state reaches the exhaust electrode 311, the sensor current Is at the negative side is mainly detected.

(Temperature Detecting Unit 52)

As shown in FIG. 2, the temperature detecting unit 52 includes a detecting circuit 521 that detects a resistance or an impedance of the sensor cell 21. The temperature detecting unit 52 is configured to utilize the resistance or the impedance detected by the detecting circuit 521 to detect the temperature of the sensor cell 21. In the case where the composition of the exhaust gas G is close to a stoichiometric region (i.e. theoretical air fuel ratio), the sensor current Is detected by the sensor detecting unit 51 is almost zero. With the state where variation of the composition of the exhaust gas G is small in the stochiometric region, the current value when the voltage is applied between the electrodes 311 and 312 of the sensor cell 21 is detected, whereby the resistance value or the impedance value thereof can be detected. Then, the temperature detecting unit 52 detects the temperature of the sensor cell 21 based on the resistance value or the impedance value using a correlation between the resistance value or the impedance value and the temperature of the sensor cell 21.

The temperature detecting unit 52 may be configured to estimate the temperature of the sensor cell 21 by detecting the resistance value or the impedance value of the heater 34. Also, in this case, the temperature detecting unit 52 may be configured to be similar to the case of detecting the resistance value or the impedance value of the sensor cell 21.

(Heater Control Unit 53)

As shown in FIG. 3, the heater control unit 53 is configured to apply an application voltage Vh as a pulse-wave AC voltage to the heating lead part 342 as a heating element that constitutes the heater 34. The heater control unit 53 is configured using an energization control circuit 531 that energizes the heater 34. The heater control unit 53 is configured to perform a pulse-width modulation control (PWM control) in which the duty ratio of the pulse-wave application voltage Vh is changed to adjust the application voltage Vh of the heater 34.

Figure 6:
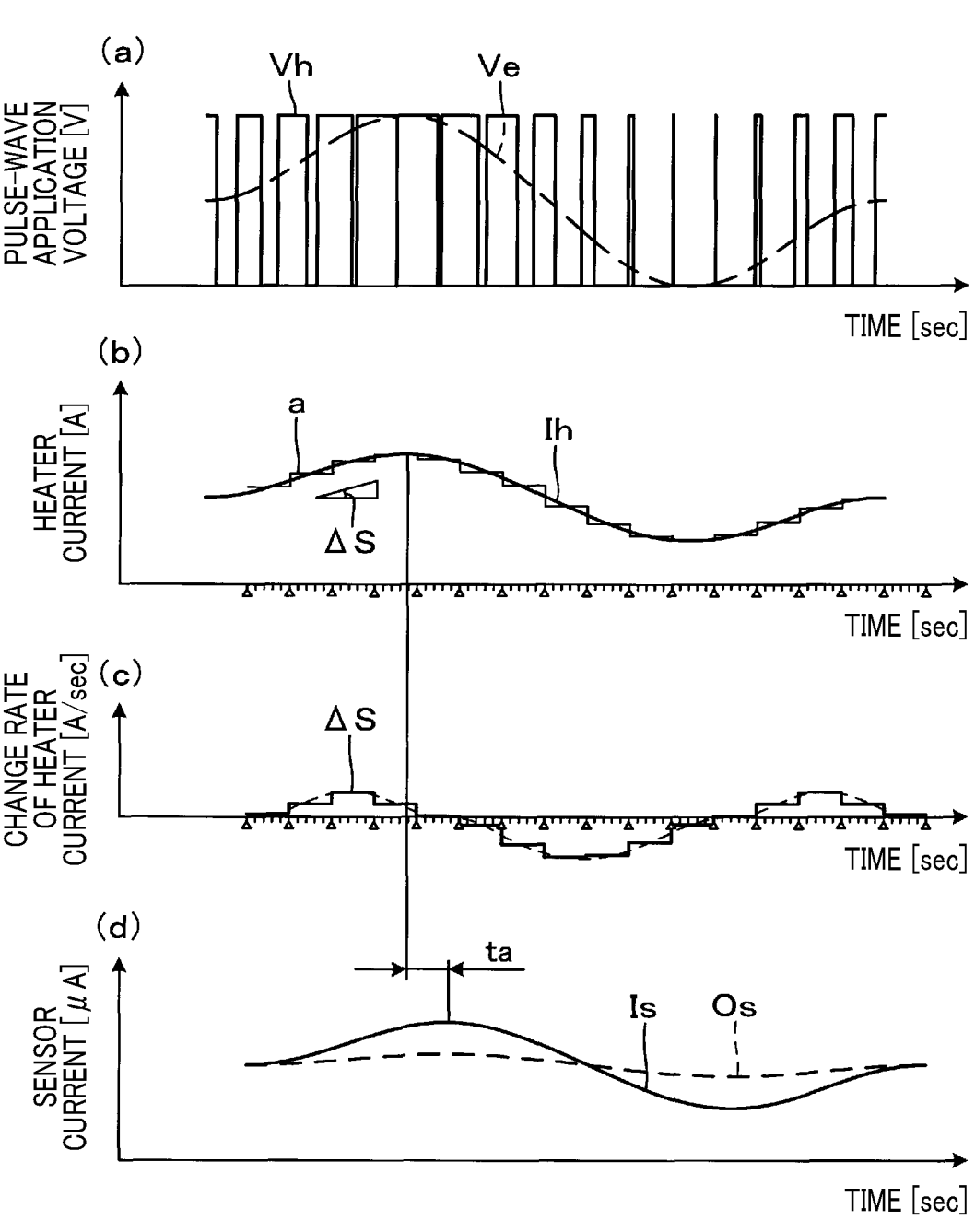
FIG. 6 is a timing diagram showing respective time-varying items according to the first embodiment in which (a) shows a pulse-wave application voltage, (b) shows a heater current, (c) shows a change rate of the heater current, and (d) shows a sensor current before/after calibration.

As shown in (a) of FIG. 6, when applying the pulse-wave application voltage Vh to the heater 34, an effective voltage Ve, which is a product of multiplication of ON voltage of the pulse-wave application voltage Vh and the duty ratio, is substantially applied to the heater 34. The duty ratio is expressed by ON voltage/one period, that is, a ratio of a duration of ON voltage to the one period of AC voltage. The target temperature to heat the sensor cell 21 by the heater control unit 53 is set to be, for example, a predetermined temperature from 600° C. to 900° C. as an activation temperature of the sensor cell 21.

(Heater Current Detecting Unit 56)

As shown in FIG. 3, the sensor control apparatus 5 includes the heater current detecting unit 56 that detects a heater current Ih flowing through the heater 34. The heater current detecting unit 56 is configured using the current detecting circuit 561 that detects the heater current Ih. The heater current detecting unit 56 is configured to detect an effective current depending on the effective voltage Ve when the heater control unit 53 applies the pulse-wave application voltage Vh to the heater 34. The heater current detecting unit 56 is configured to measure the voltage across a shunt resistor disposed in the energization control circuit 531 so as to detect the heater current Ih.

The heater current detecting unit 56 according to the present embodiment detects the heater current Ih flowing through the heater 34 near the stoichiometric region where the air fuel ratio of the internal combustion engine is controlled. In the exhaust pipe 7 in which the gas sensor 10 is disposed, in the case where an external disturbance is present causing a temperature variation of the sensor cell 21, the heater current Ih varies when the heater control unit 53 attempts to maintain the temperature of the sensor cell 21 to be the target temperature. As an external disturbance, variations in a temperature and an amount of flow of the exhaust gas G flowing through the exhaust pipe 7 are present.

Figure 7:
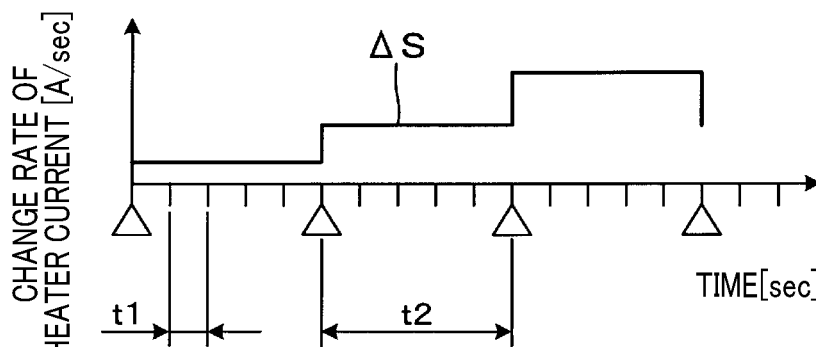
FIG. 7 is a graph showing an enlarged part of the timing diagram (c) in FIG. 6 showing the change rate of the heater current.

As shown in FIG. 6 (*b*) and FIG. 7, the sampling period t1 during which the heater current detecting unit 56 detects the heater current Ih is shorter than the period t2 of the pulse-wave application voltage Vh controlled by the heater control unit 53. With this configuration, a change in the heater current Ih can be appropriately detected. Further, according to the present embodiment, the heater current detecting unit 56 sets the sampling period t1 during which the heater current detecting unit 56 detects the heater current Ih to be shorter than 1/10 of the period t2 of the pulse-wave application voltage Vh controlled by the heater control unit 53. An interval of the period during which the sensor detecting unit 51 detects the sensor current Is and an interval of the period during which the temperature detecting unit 52 detects the resistance value of the impedance value of the sensor cell 21 may be set to be smaller than the sampling period t1 during which the heater current detecting unit 56 detects the heater current Ih. Note that FIG. 7 shows a part of FIG. 6 (*c*).

(Change Rate Calculation Unit 54)

As shown in FIG. 3, FIG. 6 (*b*), (*c*) and FIG. 7, the change rate calculation unit 54 is configured to calculate the change rate ΔS of the heater current Ih detected by the heater current detecting unit 56. When the heater control unit 53 maintains the temperature of the sensor cell 21 detected by the temperature detecting unit 52 at the target temperature, the temperature of the sensor cell 21 may vary increasingly ort decreasingly with respect to the target temperature. Further, when the heater control unit 53 maintains the temperature of the sensor cell 21 to be at the target temperature, and the temperature of the sensor cell 21 increases or decreases, it is assumed that the temperature of the sensor cell 21 barely varies. In these cases, the heater current Ih varies depending on an energization amount of the heater control unit 53, and the heater current Ih has a change rate depending on the variation of the heater current Ih.

According to the present embodiment, as shown in FIG. 6 (*c*), the change rate calculation unit 54 calculates the change rate ΔS of the heater current Ih to be a change rate ΔS of the effective current of the heater 34 depending on the effective voltage Ve which is a product of multiplication of ON voltage of the pulse-wave application voltage Vh and the duty ratio. The change rate ΔS of the effective current does not reflect small-period noise component (i.e. switching noise component) accompanied with ON-OFF switching operation of the heater 34 by the heater control unit 53. The change rate ΔS of the effective current reflects a change in noise component having a larger period than the switching noise component when the temperature of the sensor cell 21 is maintained at the target temperature.

As shown in FIG. 6 (*b*), in the change rate calculation unit 54, the heater current Ih detected by the heater current detecting unit 56 is calculated as an average value a of the heater current Ih during a predetermined period which is longer than the period t2 of the pulse-wave application voltage Vh controlled by the heater control unit 53. Then, the change rate ΔS of the heater current Ih is calculated based on an amount of change in the heat current Ih (difference value) during a predetermined period longer than the predetermined period with which the average value a of the heater current Ih is calculated or based on the differential value thereof. The change rate ΔS is expressed by an inclination of the waveform of the heater current Ih shown in FIG. 6 (*b*). The average value a of the heater current Ih may be calculated using a period which is an integer multiple of the period t2 of the pulse-wave application voltage Vh controlled by the heater control unit 53.

In the case where the heater control unit 53 continuously applies the pulse-wave application voltage Vh having the same duty ratio to the heater 34, the average value a of the heater current Ih is constant and the change rate ΔS of the heater current Ih is zero. In the case where the heater control unit 53 applies the pulse-wave application voltage Vh having different duty ratios to the heater 34, the average value a of the heater current Ih is not constant and the change rate ΔS of the heater current Ih has a predetermined value.

As shown in FIGS. 6 (*b*) and (*d*), the change rate ΔS of the heater current Ih indicates an amount (change amount) of change of the heater current Ih per unit time. It is found that the change amount of the heater current Ih per unit time generates a change amount of temperature control noise component on the sensor current Is of the sensor cell 21 detected by the sensor detecting unit 51. In other words, it is found that the sensor current Is of the sensor cell 21 detected by the sensor detecting unit 51 varies accompanied with a phase delay ta depending on a change in the heater current Ih.

(Calibration Outputting Unit 55)

As shown in FIGS. 2, 3 and 6 (*d*), the calibration outputting unit 55 reduces an influence on the sensor output which is the sensor current Is detected by the sensor detecting unit 51, caused by the change amount of the heater current Ih per unit time, and outputs the calibration output Os of the gas sensor 10. In particular, the calibration outputting unit 55 eliminates the temperature control noise component contained in the sensor output and calculates the sensor calibration output Os. The calibration outputting unit 55 outputs the sensor calibration output Os reflecting an amplitude and a period of a change in the heater current Ih and a phase delay ta produced when a change in the heater current Ih appears as a change in the sensor current Is. With this configuration, the accuracy of the sensor calibration output Os is improved.

The calibration outputting unit 55 utilizes the change rate ΔS of the effective current of the sensor current Is to calibrate the sensor output so as to cancel an induced current generated in the sensor cell 21, thereby calculating the sensor calibration output Os. When an amplitude of the change in the heater current Ih becomes larger, an amplitude of the temperature control noise component superposed to the sensor current Is tends to become larger. Also, when a period of the change in the heater current Ih becomes shorter (i.e. frequency becomes higher), an amplitude of the temperature control noise component superposed to the sensor current Is tends to become larger. An amplitude and a period of a change in the heater current Ih are reflected to the change rate ΔS of the heater current Ih. Hence, the calibration outputting unit 55 sets an amount of calibration for cancelling the temperature control noise component in the sensor current Is such that the larger the change rate ΔS of the effective current of the heater current Ih, the larger the amount of calibration is set. With this configuration, the temperature control noise component contained in the sensor current Is (sensor output) can be effectively eliminated.

Further, as shown in FIGS. 6 (b) and (d), the phase delay ta produced when a change in the heater current Ih appears as a change in the sensor current Is has an own value depending on magnetic permeability and permittivity of the insulators 33A and 33B, and the atmospheric air duct 36 disposed between the heater 34 and respective electrodes 311, 312 and respective electrode lead parts 313. Here, the magnetic permeability refers to a degree of likelihood of magnetic flux permeating to the respective electrodes 311 and 312 and respective electrode lead parts 313 from the heater 34. The magnetic flux readily permeates as the magnetic permeability becomes higher.

Further, the permittivity is correlated to an electrostatic capacitance of a pseudo capacitor formed between the heater 34 and respective electrodes 311 and 312, and respective electrode lead parts 313. The electrostatic capacitance becomes larger proportionally to the permittivity. The higher the electrostatic capacitance, the slower the permeability rate of magnetic flux.

The phase delay ta of the temperature control noise component may be acquired by an evaluation test after producing a prototype of the gas sensor 10. Then, the calibration outputting unit 55 calibrates the sensor current Is using the phase delay ta. Specifically, the calibration outputting unit 55 shifts the time by a value corresponding to the phase delay ta and calibrates the sensor current Is, thereby calculating the sensor calibration output Os.

The sensor current Is generated in the sensor cell 21 contains an induction current as a temperature control noise component produced, depending on the effective current in the heater 34, on respective electrode lead parts 313 connected to the exhaust electrode 311 and the atmosphere electrode 312 in the sensor cell. When the heater control unit 53 performs a pulse width modulation control of the heater 34, a current changes in the heater 34 accompanied with ON-OFF switching of the pulse-wave application voltage Vh, and a magnetic flux is produced depending on the current change around an axis line of the heater 34 in the lead-wire direction. Then, the magnetic flux causes an induction current on the respective electrode lead parts 312 connected to the exhaust electrode 311 and the atmosphere electrode 312 in the sensor cell 21, and the induction current is superposed to the sensor current Is. Also, the induction current is superposed to the sensor current Is accompanied with the phase delay ta.

(Correlation Map M)

Figure 8:
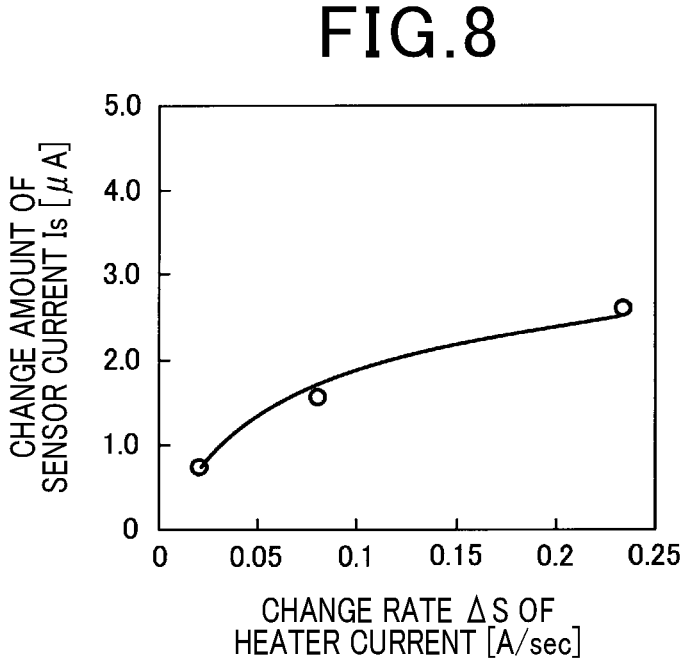
FIG. 8 is a graph showing a relationship between the change rate of the heater current and an amount of change of the sensor current according to the first embodiment.

FIG. 8 is a graph showing a relationship between the change rate ΔS [A/sec] of the heater current Ih and an amount of change [uA] of the sensor current Is. The relationship is obtained in the following manner. When the heater control unit 53 appropriately changes the application voltage Vh to the heater 34, the heater current detecting unit 56 detects the heater current Ih and the sensor detecting unit 51 detects the heater current Ih, thereby obtaining the relationship between the change rate ΔS [A/sec] of the heater current Ih and an amount of change [uA] of the sensor current Is. Note that the larger the change rate ΔS of the heater current Ih, the larger the change rate of the sensor current Is. In FIG. 8, the amount of change (change amount) of the sensor current Is relative to the change rate ΔS of the heater current Ih is plotted.

Figure 9:
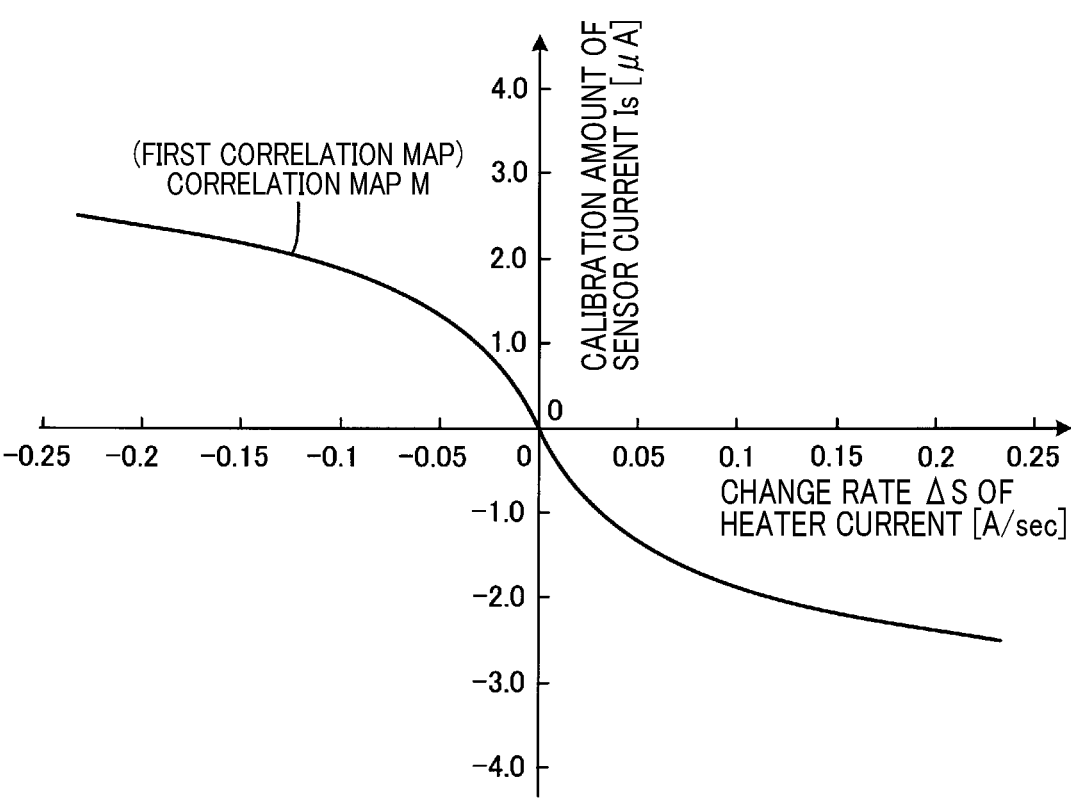
FIG. 9 is a map showing a correlation between the change rate of the heater current and a calibration amount of the sensor current according to the first embodiment.

As shown in FIG. 9, the sensor control apparatus 5 has a correlation map M that shows a correlation between the change rate ΔS of the heater current Ih and an amount of calibration of the sensor current (sensor output) calculated by the calibration outputting unit 55. Since the amount of change of sensor current Is is considered as a temperature control noise component, the calibration amount of the sensor current Is is defined as a value where a negative sign is added to the change amount of the sensor current Is.

In the correlation map M, the change rate ΔS of the heater current Ih includes a positive side change rate ΔS which is an increasing side of the heater current Ih and a negative side change rate ΔS which is a decreasing side of the heater current Ih. In the correlation map M, when the change rate ΔS of the heater current Ih is on the positive side, a correlation is present in which the higher the change rate ΔS of the heater current Ih on the positive side, the higher the calibration amount of the sensor current Is is set in the negative direction. Further, in the correlation map M, when the change rate ΔS of the heater current Ih is in the negative side, a correlation is present in which the higher the change rate ΔS of the heater current Ih in the negative side, the higher the calibration amount of the sensor current Is is set in the positive direction.

The calibration outputting unit 55 calibrates the change rate ΔS based on the calibration amount of the sensor current Is determined by comparing with the correlation map M and output the sensor calibration output Os. Also, the calibration outputting unit 55 utilizes, when calculating the sensor calibration output Os, the calibration amount of the sensor output at a time earlier than the current time by the phase delay ta of the temperature control noise component. The correlation map M is utilized, whereby the calibration of the sensor output Is by the calibration outputting unit 55 can readily be performed.

(Operation of Gas Concentration Detecting Apparatus 1)

FIG. 6 (a) shows a change in the pulse-wave application voltage Vh applied to the heater 34 by the heater control unit 53. In FIG. 6 (a), an effective value of the application voltage Vh applied to the heater 34 is also shown. FIG. 6 (b)

shows the heater current Ih flowing through the heater 34 which is detected by the heater current detecting unit 56. The heater current Ih has a similar waveform to the effective value of the application voltage Vh applied to the heater 34.

FIG. 6 (*c*) shows a time-varying wave of the change rate ΔS of the heater current Ih. The time-varying wave of the change rate ΔS of the heater current Ih refers to an amount of change of the heater current Ih per unit time which is calculated by the change rate calculation unit 54. The change rate ΔS of the heater current Ih is calculated by a difference value or the like of the heater current Ih in an integer multiple of a period of the pulse-wave application voltage Vh.

FIG. 6 (*d*) shows a time-varying wave of the sensor current Is detected by the sensor detecting unit 51. The sensor current Is is detected as a waveform having a phase delay ta with respect to a time change value of the heater current Ih. Then, a time change value of the sensor current Is accompanied by a time change of the heater current Ih, as a temperature control noise component, is calibrated with the change rate ΔS of the heater current Ih considering the phase delay ta. Thus, the sensor calibration output Os after calibration is not influenced by the temperature control noise component.

(Detection Method of Gas Concentration)

Hereinafter, with reference to a flowchart of FIG. 10, an example of detection method of gas concentration using the gas concentration detection apparatus 1 will be described. The gas sensor 10 and the sensor control apparatus 5 are activated in response to an activation of the internal combustion engine of the vehicle and the engine control apparatus 6 thereof. In the sensor control apparatus 5, the heater control unit 53 performs pulse width modulation control for the heater 34 and the heater 34 heats the sensor cell 21 (step S101). Subsequently, the temperature detecting unit 52 detects the temperature of the sensor cell 21 (step S102), and continuously heats the sensor cell 21 till the temperature of the sensor cell 21 reaches the activation temperature (step S103). The activation temperature of the sensor cell 21 is the target temperature with which the heater control unit 53 heats the sensor cell 21.

Next, when the temperature of the sensor cell 21 is detected by the temperature detecting unit 52, the sensor detecting unit 51 detects the sensor current Is at a predetermined sampling interval (step S104) and the heater current detecting unit 56 detects the heater current Ih (step S105). Next, the sensor current Is and the heater current Ih are detected a plurality of times and when determined that one or more predetermined intervals where an average value of the heater current Ih is acquired has passed (step S106), the change rate calculation unit 54 calculates the change rate ΔS of the heater current Ih flowing through the heater 34 (step S107).

At this moment, the change rate ΔS of the heater current Ih is acquired by dividing a difference value between the average value a of the heater current Ih at the current time and the average value a of the heater current Ih at a past time by a time difference between the current time and the past time.

Next, the calibration outputting unit 55 compares the change rate ΔS of the heater current Ih with the correlation map M, thereby determining the calibration amount of the sensor current Is (step S108). Then, the calibration outputting unit 55 calculates the sensor calibration output Os by using the calibration amount of the sensor current Is at a time earlier than the current time by a phase delay ta of the temperature control noise component and the average value a of the heater current Ih at the current time (step S109).

When the calibration value of the sensor current Is is in a negative side, the calibration value of the sensor current Is is subtracted from the average value a of the sensor current Is at the current time, and when the calibration value of the sensor current Is is on the positive side, the calibration value of the sensor current Is is added to the average value a of the sensor current Is at the current time. Thereafter, processes at steps S104 to S110 are repeatedly executed until the control of the sensor control apparatus 5 is stopped (step S110).

Effects and Advantages

According to the sensor control apparatus 5 of the gas concentration detecting apparatus 1 of the present embodiment, the change rate calculation unit 54 calculates the change rate ΔS of the heater current Ih flowing through the heater 34 when the heater control unit 53 maintains the temperature of the sensor cell 21 detected by the temperature detecting unit 52 to be the target temperature. The change rate ΔS is indicated as a rate of change calculated when the application voltage Vh of the heater 34 is adjusted so as to avoid temperature change in the temperature cell 21 from the target temperature in the case where the temperature of the sensor cell 21 is influenced by an external disturbance.

When the temperature of the sensor cell 21 is influenced by an external disturbance and the sensor cell detecting unit 51 detects the sensor current Is generated in the sensor cell 21 to be a sensor output, the sensor output is highly likely to contain a temperature control noise component superposed thereon which is accompanied by a change in the application voltage Vh as an effective value to the heater 34. Here, the calibration outputting unit 55 calibrates the sensor output using the change rate ΔS of the heater current Ih calculated by the change rate calculation unit 54 and outputs the sensor calibration output Is of the gas sensor 10.

With this configuration, according to the gas concentration detecting apparatus 1 of the present embodiment, an influence of the temperature control noise component to the sensor output is eliminated and the detection accuracy of the sensor output of the gas sensor 10 is enhanced. Further, the change rate ΔS of the heater current Ih is used, thereby effectively enhancing the detection accuracy of the sensor output of the gas sensor 10.

Second Embodiment

Figure 12:
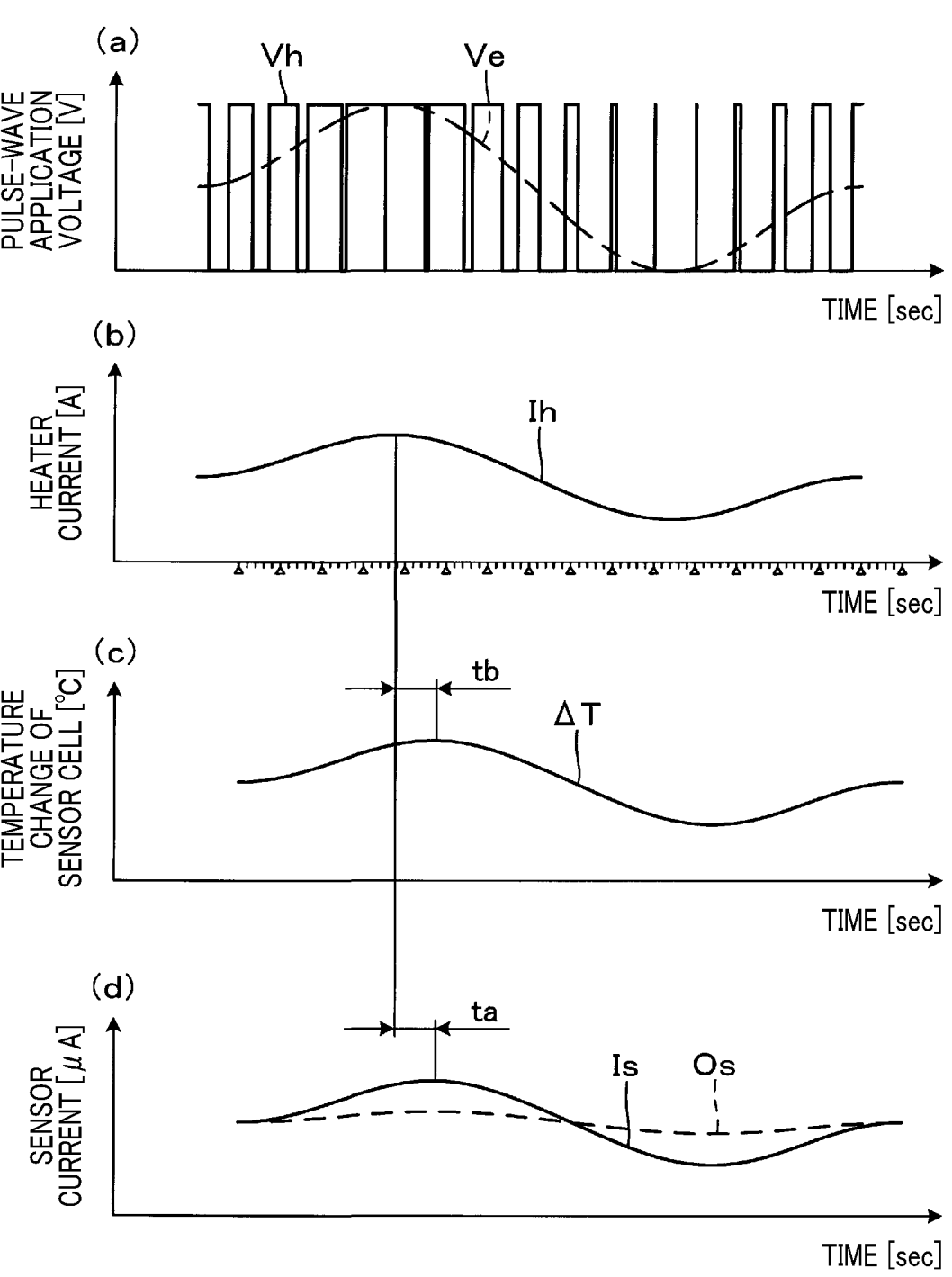
FIG. 12 is a timing diagram showing respective time-varying items according to the second embodiment in which (a) shows a pulse-wave application voltage, (b) shows a heater current, (c) shows a temperature change of the sensor cell, and (d) shows a sensor current before/after calibration.

As shown in FIG. 12 (*a*), (*b*), (*c*) and (*d*), according to the gas concentration detecting apparatus 1 of the present embodiment, the calibration outputting unit 55 of the sensor control apparatus 5 calibrates the sensor output as the sensor current Is using a temperature detected by the temperature detecting unit 52 other than the change rate ΔS of the heater current Ih. The calibration outputting unit 55 of the present embodiment calibrates the sensor current Ih considering a fact that a temperature of the sensor cell 21 influences an amount of the sensor current Is and the phase delay ta of the sensor current Is, and calculates the calibration output Os.

Figure 11:
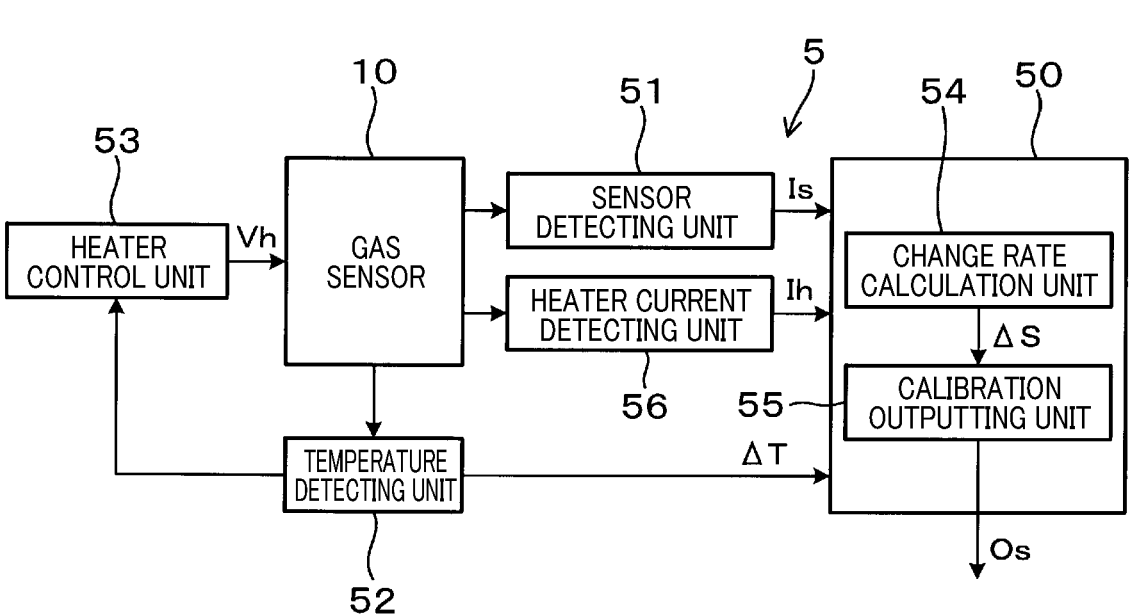
FIG. 11 is an explanatory diagram schematically showing an electrical configuration of the sensor control apparatus according to a second embodiment.

FIG. 11 schematically shows an electrical configuration of the sensor control apparatus 5 according to the present embodiment. In the sensor control apparatus 5, the heater current Ih detected by the heater current detecting unit 56 is utilized and the change rate calculation unit 54 calculates the change rate ΔS of the heater current Ih. Then, the calibration outputting unit 55 calibrates the sensor current Is detected by the sensor detecting unit 51 based on the change rate ΔS and a temperature change $\Delta T$ of the sensor cell 21 by the heater control unit 53, and outputs the sensor calibration output Os.

The temperature of the sensor cell 21 detected by the temperature detecting unit 52 influences an amount of the temperature control noise component generated on the sensor current Is and the phase delay ta. The magnetic permeability of the insulators 33A and 33B and the atmospheric air duct 36 disposed between the heater 34 and respective electrodes 311, 312 and respective electrode lead parts 313 becomes higher as the temperature increases. In other words, the higher the temperature of the sensor element 2, the larger a variation of the sensor current Is accompanied with a change in the heater current Ih is. This is an inverse relationship of a case where the higher the temperature, the higher the resistance value of the heater 34 is, and the heater current Ih is difficult to flow.

Further, the permittivity and the electrostatic capacitance of the insulators 33A and 33B and the atmospheric air duct 36 disposed between the heater 34 and respective electrodes 311, 312 and respective electrode lead parts 313 becomes lower as the temperature increases. For an induction current generated at the respective electrodes 311 and 312 and the respective lead parts 313 of the sensor cell 21, the smaller the electrostatic capacitance, the shorter the phase delay ta till superposing on the sensor current Is, depending on a change in the heater current Ih. That is, the higher the temperature of the sensor element 2, the shorter the phase delay ta of a change in the sensor current Is with respect to a change in the heater current Ih is.

Similar to the first embodiment, FIG. 12 (a), (b) show time-varying waveforms of the pulse-wave application voltage Vh and the heater current Ih. FIG. 12 (c) shows a temperature change $\Delta T$ of the sensor cell 21 when the heater current Ih changes. The temperature change $\Delta T$ of the sensor cell 21 has a predetermined phase delay tb with respect to a change in the heater current Ih similar to the sensor current Is shown in FIG. 12 (d). The phase delay ta of the sensor current Is and the phase delay tb of the temperature change $\Delta T$ with respect to a change in the heater current Ih are considered to be similar values.

The sensor control apparatus 5 according to the present embodiment is provided with a first correlation map M1 showing a correlation between the change rate $\Delta S$ of the heater current Ih and the calibration amount of the sensor current Is calculated by the calibration outputting unit 55, and a second correlation map M2 showing a correlation between the temperature of the sensor cell 21 and the calibration amount of the sensor current Is outputted by the calibration outputting unit 55. The first correlation map M1 is similar to the correlation map M of the first embodiment shown in FIG. 9.

Figure 13:
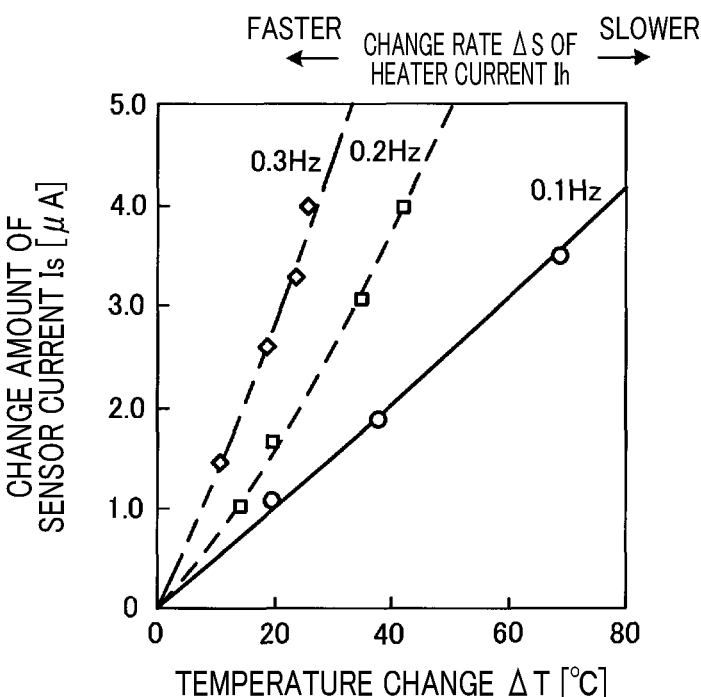
FIG. 13 is a graph showing a relationship between a temperature change of the sensor cell and an amount of change of the sensor current using the change rate of the heater current as a parameter according to the second embodiment.

FIG. 13 is a graph showing a relationship between a temperature change $\Delta T$ [° C.] indicating an amount of increase in the temperature of the sensor cell 21 and an amount of change [μA] of the sensor current Is, where the heater current detecting unit 56 detects the heater current Ih and the sensor detecting unit 51 detects the sensor current Is when the heater control unit 53 changes the application voltage Vh to the heater 34, thereby acquiring the relationship using the change rate $\Delta S$ [μA/sec] of the heater current Ih as a parameter. The temperature change $\Delta T$ refers to a temperature change from the target temperature. The higher the temperature change $\Delta T$, the larger the change amount of the sensor current Is is. Further, the higher the change rate $\Delta S$ of the heater current Ih, the larger a step of the change amount of the sensor current Is with respect to the temperature change $\Delta T$ is.

In FIG. 13, the change rate $\Delta S$ of the heater current Ih is shown at 0.1 Hz, 0.2 Hz and 0.3 Hz. In FIG. 13, values of the change amount of the sensor current Is with respect to the temperature change $\Delta T$ are plotted with a parameter of the change rate $\Delta S$ of the heater current Ih.

Figure 14:
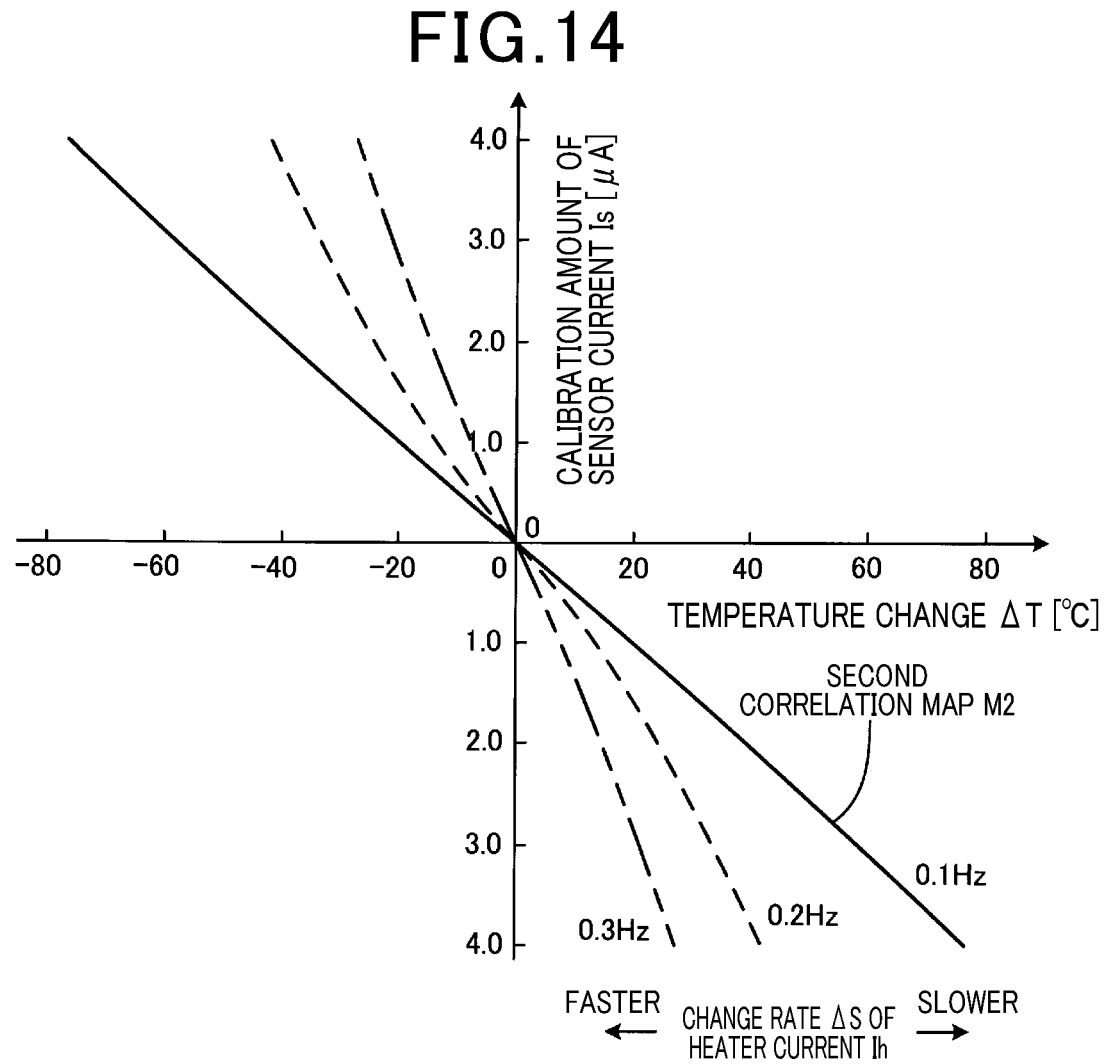
FIG. 14 is a graph showing a correlation between a temperature change of the sensor cell and an amount of calibration of the sensor current using the change rate of the heater current as a parameter according to the second embodiment.

As shown in FIG. 14, Since the change amount of the sensor current Is is considered as a temperature control noise component, the calibration amount of the sensor current Is is defined as a value where a negative sign is added to the change amount of the sensor current Is. The calibration amount of the sensor current (sensor output) Is has a relationship in which the larger the change rate $\Delta S$ of the heater current Ih, the larger the calibration amount of the sensor current IS is, and the higher the temperature change $\Delta T$, the larger the calibration amount of the sensor current IS is.

As shown in FIG. 14, in the second correlation map M2, the temperature change $\Delta T$ includes a positive side change rate in which the temperature change $\Delta T$ changes increasingly and a negative side change rate in which the temperature change $\Delta T$ changes decreasingly. In the second correlation map M2, when the temperature change $\Delta T$ is on the positive side, a correlation is present such that the larger the change rate $\Delta T$ in the positive side, the larger the calibration amount of the sensor current Is is on the negative side. Further, in the second correlation map M2, when the temperature change $\Delta T$ is in the negative side, a correlation is present such that the larger the change rate $\Delta T$ in the negative side, the larger the calibration amount of the sensor current Is is on the positive side.

The calibration outputting unit 55 calculates the sensor calibration output Os based on a first calibration amount of the sensor current Is determined by comparing the change rate $\Delta S$ of the heater current Ih with the first correlation map M1, and a second calibration amount of the sensor current Is determined by comparing the change rate $\Delta S$ of the heater current Ih and the temperature change $\Delta T$ with the second correlation map M2. Also, the calibration outputting unit 55 utilizes, when calculating the sensor calibration output Os, the first calibration amount of the sensor current Is at a time earlier than the current time by the phase delay ta and the second calibration amount of the sensor current Is at a time earlier than the current time by the phase delay tb.

In other words, the calibration outputting unit 55 of the present embodiment sums the first calibration amount of the sensor current Is at a time earlier than the current time by the phase delay ta and the second calibration amount of the sensor current Is at a time earlier than the current time by the phase delay tb to outputs the sensor calibration output Os. The first correlation map M1 and the second correlation map M2 are used, whereby calibration accuracy of the sensor current Is by the calibration outputting unit 44 can be further enhanced.

(Operation of Gas Concentration Detecting Apparatus 1)

Figure 15:
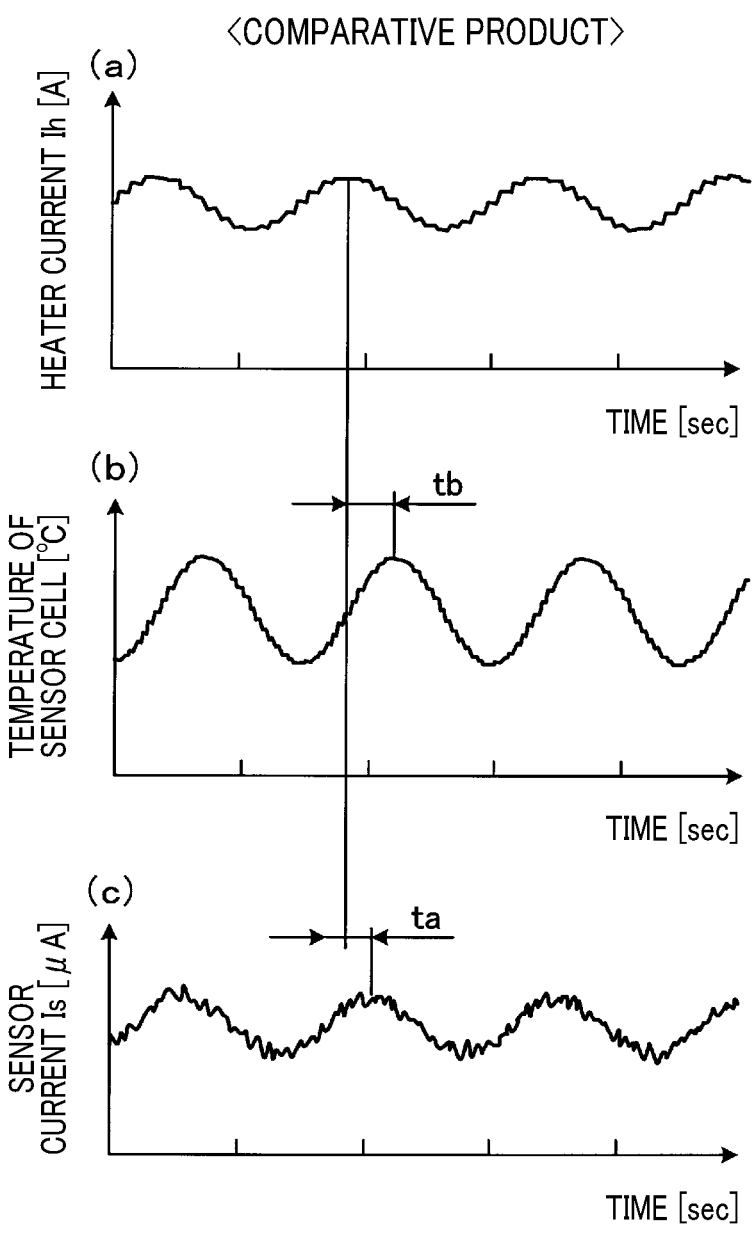
FIG. 15 is a graph for a comparative product in the second embodiment showing respective time-varying items in which (a) shows a heater current, (b) shows the temperature of the sensor cell and (c) shows the sensor current.

FIGS. 15 (a), (b) and (c) illustrate, for a conventional gas concentration detecting apparatus (comparative example) having no change rate calculation unit 54 and calibration outputting unit 55, a change in the sensor current (sensor output) Is when an external disturbance causes variations in the heater current Ih and the temperature of the sensor cell 21 in the case where the heater control unit 53 controls the temperature of the sensor cell 21 to be the target temperature. In FIGS. 15 (a), (b) and (c), a case will be described in which change in the temperature of the exhaust gas G supplied to the gas sensor 10 is simulated by a sinusoidal wave.

FIG. 15(a) illustrates a change in the heater current Ih, FIG. 15 (b) illustrates a change in the temperature of the sensor cell 21 and FIG. 15 (c) illustrates a change in the sensor current (sensor output) Is. As shown in FIGS. 15 (a), (b) and (c), it is realized that the sensor current Is varies due to a predetermined phase delay ta when the heater current Ih and the temperature of the sensor cell 21 vary.

Figure 16:
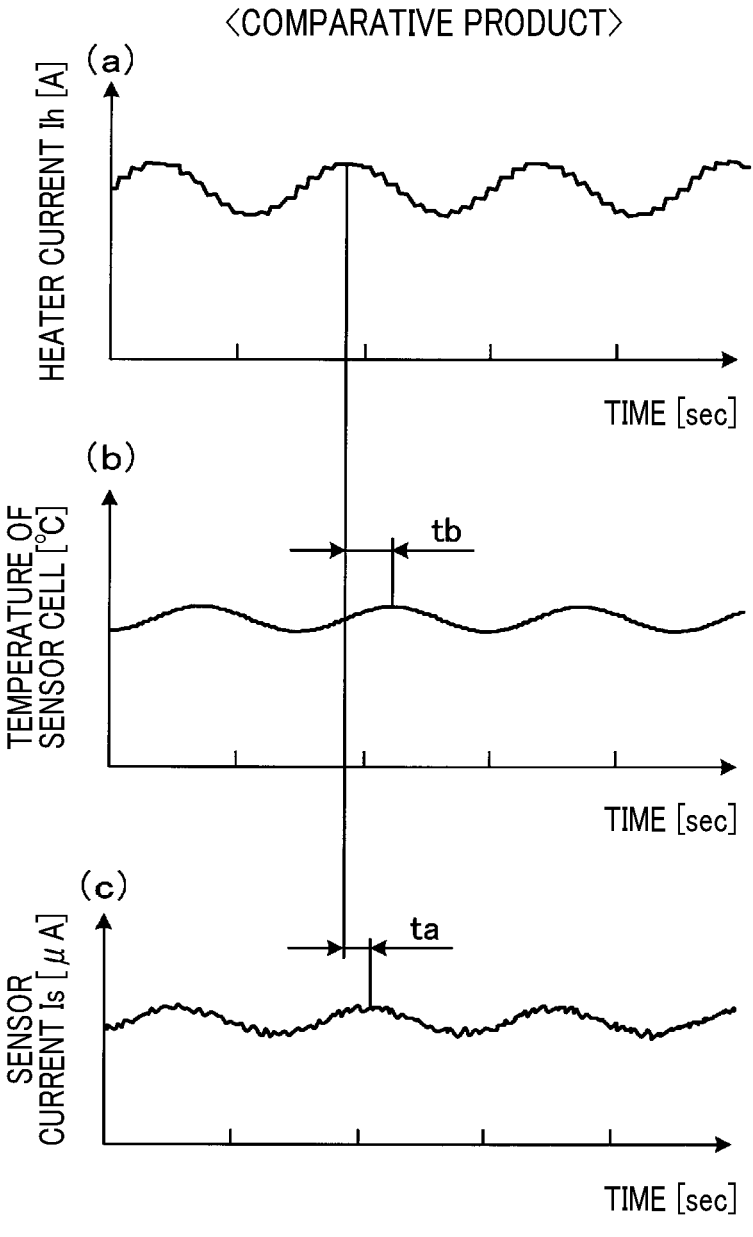
FIG. 16 is a graph showing a time-varying items of a comparative product in the second embodiment in which (a) shows a heater current, (b) shows a temperature of the sensor cell and (c) shows the sensor current.

FIGS. 16 (a), (b) and (c) illustrate a change in the sensor current Is when the step of a change amount of the temperature 21 becomes small for a comparative example. It can be seen that a change in the sensor current Is is small when the step of a change amount of the temperature 21 becomes small. Although illustration is omitted, when the period of the heater current Ih becomes shorter (frequency of vibration becomes larger), an amplitude of the sensor current Is becomes larger.

Figure 17:
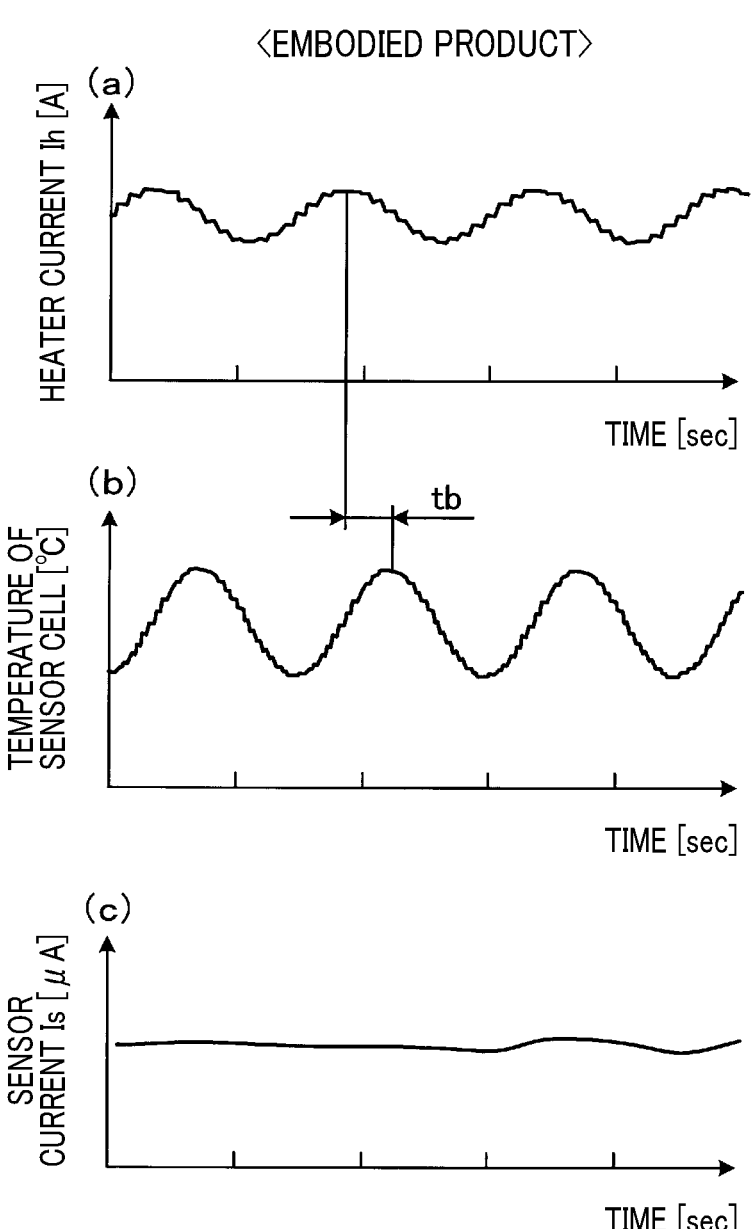
FIG. 17 is a graph showing a time-varying items of an embodied product in the second embodiment in which (a) shows a heater current, (b) shows a temperature of the sensor cell and (c) shows the sensor current.

FIGS. 17 (a), (b) and (c) illustrate, for the gas concentration detecting apparatus 1 (embodied example) of the second embodiment 2 provided with the change rate calculation unit 54 and the calibration outputting unit 55, a change in the sensor current (sensor output) Is when an external disturbance causes variations in the heater current Ih and the temperature of the sensor cell 21 in the case where the heater control unit 53 controls the temperature of the sensor cell 21 to be the target temperature. Also in FIGS. 17 (a), (b) and (c), a case will be described in which change in the temperature of the exhaust gas G supplied to the gas sensor 10 is simulated by a sinusoidal wave.

As shown in FIG. 17 (c), for the embodied product, it is realized that a change in the sensor current Is is minimized by the calibration of the sensor current Is performed by the change rate calculation unit 54 and the calibration outputting unit 55.

Other configurations, effects and advantages and the like in the gas concentration detecting apparatus 1 of the present embodiment is similar to those in the first embodiment. Also in the present embodiment, constituents indicated by the same reference symbols as those in the first embodiment are the same as the constituents in the first embodiment.

Other Embodiments

The sensor detecting unit 51 may be configured to convert the sensor current Is to the sensor voltage for the detecting. In this case, the calibration outputting unit 55 calibrates the sensor voltage and outputs the sensor calibration voltage Os.

Moreover, the change rate calculation unit 54 may calculate the change rate of the application voltage Vh applied to the heater 34 instead of calculating the change rate ΔS of the heater current Ih. The application voltage Vh applied to the heater 34 appropriately changes depending on a change in the temperature of the sensor cell 21. The change rate of the application voltage Vh applied to the heater 34 is determined as a rate of change of the effective value of the application voltage Vh. Also in this case, the calibration outputting unit 55 may preferably calibrate the sensor current Is using a change in the temperature of the sensor cell 21 described in the second embodiment. Further, the change rate calculation unit 54 may utilize both the change rate ΔS of the heater current Ih and the change rate of the application voltage Vh applied to the heater 34.

The heater control unit 53 may utilize the pulse frequency modulation (PFM) instead of utilizing the pulse-width modulation (PWM) to apply the application voltage Vh to the heater 34. In the PFM control, the interval of the pulse application voltage Vh having the same width applied to the heater 34 is appropriately changed.

The present disclosure is not limited to the respective embodiments, but may constitute different embodiments without departing from the spirit of the present disclosure. The present disclosure includes various modification examples and modification examples within an equivalent thereof. Further, various combinations of constituents and embodiments anticipated from the present disclosure are included in the technical scope of the present disclosure.

CONCLUSION

The present disclosure provides a gas concentration detecting apparatus capable of enhancing the detection accuracy of the sensor output of the gas sensor, in which noise components produced when a change in a voltage is applied to the heater as an effective value are prevented from affecting the sensor output.

A first aspect of the present disclosure is a gas concentration detecting apparatus including: a gas sensor having one or more sensor cells each provided with a pair of electrodes on a solid electrolyte, and a heater generating heat when being energized to heat the sensor cell; and a sensor control apparatus that controls an operation of the sensor cell and the heater.

The sensor control apparatus includes: a sensor detecting unit that detects a sensor current or a sensor voltage produced in the sensor cell; a temperature detecting unit that detects a temperature of the sensor cell; a heater control unit that adjusts an application voltage applied to the heater; a change rate calculation unit that calculates at least either a change rate of an application voltage applied to the heater or a change rate of a heater current flowing through the heater when the heater control unit maintains the temperature detected by the temperature detecting unit to be at a target temperature; and a calibration outputting unit that utilizes the change rate calculated by the change rate calculation unit to calibrate a sensor output which is the sensor current or the sensor voltage detected by the sensor detecting unit, thereby calculating a sensor calibration output of the gas sensor.

According to the sensor control apparatus of a gas concentration detecting apparatus of the above first aspect, at least either the change rate of the application voltage applied to the heater or the change rate of the heater current flowing through the heater is calculated by the change rate calculation unit when the heater control unit maintains the temperature of the sensor cell detected by the temperature detecting unit to be at the target temperature. These change rates are each expressed as a rate of change calculated when adjusting the application voltage of the heater such the temperature of the sensor cell is not shifted from the target temperature in the case where the temperature of the sensor cell is influenced by an external disturbance.

In the case where the temperature of the sensor cell is influenced by an external disturbance, when the sensor detecting unit detects the sensor current or the sensor voltage generated in the sensor cell as the sensor output, a noise component accompanied by a change in the application voltage as an effective voltage applied to the heater is most likely to become superposed on the sensor output. For this reason, the calibration outputting unit calibrates the sensor output using the change rate calculated by the change rate calculation unit, and calculates the sensor calibration output of the gas sensor.

With this configuration, according to the gas concentration detecting apparatus of the first aspect, the sensor output is prevented from being influenced by the noise component accompanied by a change in the application voltage as the effective value applied to the heater, and the detection accuracy of the sensor output of the gas sensor.

The detection of the temperature of the sensor cell by the temperature detecting unit includes a case of estimating the temperature based on various information.

What is claimed is:

1. A gas concentration detecting apparatus comprising:
a gas sensor having at least one sensor cell each provided with a pair of electrodes on a solid electrolyte, and a heater generating heat when being energized to heat the at least one sensor cell; and
a sensor control apparatus configured to control operation of the at least one sensor cell and the heater,
wherein
the sensor control apparatus comprises:
a sensor detector configured to detect a sensor current or a sensor voltage produced in the at least one sensor cell;
a temperature detector configured to detect a temperature of the at least one sensor cell;
a heater control unit configured to adjust an application voltage applied to the heater; and
a computer comprising:
a change rate calculation unit configured to calculate at least either a change rate of the application voltage applied to the heater or a change rate of a heater current flowing through the heater when the heater control unit maintains the temperature detected by the temperature detector to be a target temperature; and
a calibration outputting unit configured to utilize the change rate calculated by the change rate calculation unit to calibrate a sensor output which is the sensor current or the sensor voltage detected by the sensor detector, thereby calculating a sensor calibration output of the gas sensor.

2. The gas concentration detecting apparatus according to claim 1, wherein
the sensor control apparatus further comprises a heater current detector configured to detect the heater current;
the change rate calculation unit is configured to calculate the change rate of the heater current detected by the heater current detector; and
the calibration outputting unit is configured to calibrate the sensor output using the change rate of the heater current and calculates the sensor calibration output.

3. The gas concentration detecting apparatus according to claim 2, wherein
the calibration outputting is configured to utilize the temperature detected by the temperature detector to calibrate the sensor output, considering a fact that the temperature influences an amount of the sensor current and the temperature influences a phase delay of the sensor current, and calculates the sensor calibration output.

4. The gas concentration detecting apparatus according to claim 3, wherein
the sensor control apparatus further comprises a first correlation map that shows a correlation between the change rate of the heater current and a calibration amount of the sensor output calculated by the calibration outputting unit, and a second correlation map that shows a correlation between the temperature and the calibration amount of the sensor output calculated by the calibration outputting unit;
the calibration amount of the sensor output has a relationship such that the larger the change rate of the heater current, the larger the calibration amount of the sensor output is, and the higher the temperature, the larger the calibration amount of the sensor output is; and
the calibration outputting unit is configured to output the sensor calibration output, based on a first calibration amount of the sensor output determined by comparing the change rate of the heater current with the first correlation map and a second calibration amount of the sensor output determined by comparing an amount of change in the temperature with the second correlation map.

5. The gas concentration detecting apparatus according to claim 2, wherein
the heater control unit is configured to perform a pulse-width modulation control in which a duty ratio of a pulse-wave application voltage is changed to adjust the application voltage applied to the heater; and
a sampling period during which the heater current detector detects the heater current is shorter than a period of the pulse-wave application voltage.

6. The gas concentration detecting apparatus according to claim 5, wherein
the change rate of the heater current is calculated by the change rate calculation unit, as a change rate of an effective current at the heater, depending on an effective voltage which is a product of multiplication of an ON voltage of the pulse-wave application voltage and the duty ratio.

7. The gas concentration detecting apparatus according to claim 6, wherein
the sensor detector is configured to detect the sensor current produced in the at least one sensor cell;
the sensor current produced in the at least one sensor cell contains an induced current generated depending on the effective current at the heater, at respective electrode lead parts of the pair of electrodes of each sensor cell of the at least one sensor cell; and
the calibration outputting unit is configured to utilize the change rate of the effective current to calibrate the sensor output so as to cancel the induced current generated at the at least one sensor cell and outputs the sensor calibration output.

8. The gas concentration detecting apparatus according to claim 7, wherein
the calibration outputting unit is configured to calibrate the sensor output using a phase delay produced at the heater current due to the induced current and calculate the sensor calibration output.

9. The gas concentration detecting apparatus according to claim 1, wherein
the sensor control apparatus further comprises a correlation map that shows a correlation between the change rate of the application voltage or the change rate of the heater current and a calibration amount of the sensor output calculated by the calibration outputting unit;
the calibration amount of the sensor output has a relationship such that the larger the change rate of the application voltage or the change rate of the beater current, the larger the calibration amount of the sensor output is; and
the calibration outputting unit is configured to output the sensor calibration output, based on the calibration amount of the sensor output determined by comparing the change rate of the application voltage or the change rate of the heater current calculated by the change rate calculation unit with the correlation map.

\* \* \* \* \*